US008259130B2

(12) United States Patent  
Brown et al.

(10) Patent No.: US 8,259,130 B2  
(45) Date of Patent: Sep. 4, 2012

(54) COLOR BUFFER CONTRAST THRESHOLD FOR ADAPTIVE ANTI-ALIASING

(75) Inventors: Jeffrey Douglas Brown, Rochester, MN (US); Russell Dean Hoover, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 11/693,221

(22) Filed: Mar. 29, 2007

(65) Prior Publication Data

US 2008/0238920 A1     Oct. 2, 2008

(51) Int. Cl.  
*G09G 5/00*           (2006.01)

(52) U.S. Cl. ....................................................... 345/611

(58) Field of Classification Search .................. 345/617, 345/611  
See application file for complete search history.

(56) References Cited

U.S. PATENT DOCUMENTS

| | | | |
|---|---|---|---|
| 2001/0036293 A1* | 11/2001 | Laumeyer et al. | 382/104 |
| 2002/0097439 A1* | 7/2002 | Braica | 358/3.26 |
| 2007/0182732 A1 | 8/2007 | Woop et al. | |
| 2009/0033653 A1 | 2/2009 | Brown et al. | |

OTHER PUBLICATIONS

Mitchell, Don P. "Generating Antialiased Images at Low Sampling Densities." ACM SIGGRAPH Computer Graphics 21.4 (Jul. 1987): 65-72.*

N. Loofbourrow and Steven Shafer, "Optimizing Ray Tracing with Visual Coherence," tech. report CMU-CS-93-209, Computer Science Department, Carnegie Mellon University, Dec. 1993.*

Adamson, Anders, Marc Alexa, and Andrew Nealen. "Adaptive Sampling of Intersectable Models Exploiting Image and Object-Space Coherence." I3D '05 Proceedings of the 2005 Symposium on Interactive 3D Graphics and Games: 171-78.*

Liu, Xiao-dong et al, "The Research of Tracing Causing Objects Jagged Edges", Application Research of Computers, 2002, vol. 19, No. 4 http://www.wanfangdata.com.cn.

Baiqing, Qu et al, "A Method for the Adaptive Anti-Aliasing Based on the Pixel-Coherence", Electronic Technology IT Age, 2004, No. 3 http://www.wanfangdata.com.cn.

* cited by examiner

*Primary Examiner* — Xiao M. Wu  
*Assistant Examiner* — Scott E Sonners  
(74) *Attorney, Agent, or Firm* — Patterson & Sheridan LLP

(57) ABSTRACT

According to one embodiment of the invention, by increasing the number of rays issued through adjacent pixels with colors of high contrast while maintaining the number of rays issued through adjacent pixels which do not have colors of high contrast, a ray tracing image processing system may render an anti-aliased image while minimizing the increase in workload experienced by the image processing system. Additionally, according to another embodiment of the invention, by maintaining the number of rays issued through adjacent pixels which have colors of low contrast while increasing the number of rays issued through adjacent pixels which do not have colors of low contrast, the image processing system may reduce workload experienced while performing ray tracing while maintaining the quality of the rendered image.

21 Claims, 20 Drawing Sheets

COLOR BUFFER CONTRAST THRESHOLD FOR ADAPTIVE ANTI-ALIASING

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of rendering an image of a three-dimensional scene by performing ray tracing with adaptive anti-aliasing is provided. The method generally comprising: identifying high contrast areas of pixels based on an initial set of rays issued into the scene; and issuing an additional set of rays into one or more of the high contrast areas.

According to another embodiment of the invention a computer readable medium containing a program is provided. The program when executed performs an operation generally comprising: identifying high contrast areas of pixels based on an initial set of rays issued into a three-dimensional scene; and issuing an additional set of rays into one or more of the high contrast areas.

According to another embodiment of the invention an image processing system is provided. The image processing system generally comprising: a memory device configured to store color information for each pixel in a frame of pixels; and a processing element configured to identify high contrast areas of pixels based on an initial set of rays issued into a three-dimensional scene, and issue an additional set of rays into one or more of the high contrast areas.

DETAILED DESCRIPTION OF THE PREFERRED EMBODIMENTS

Figure 1:
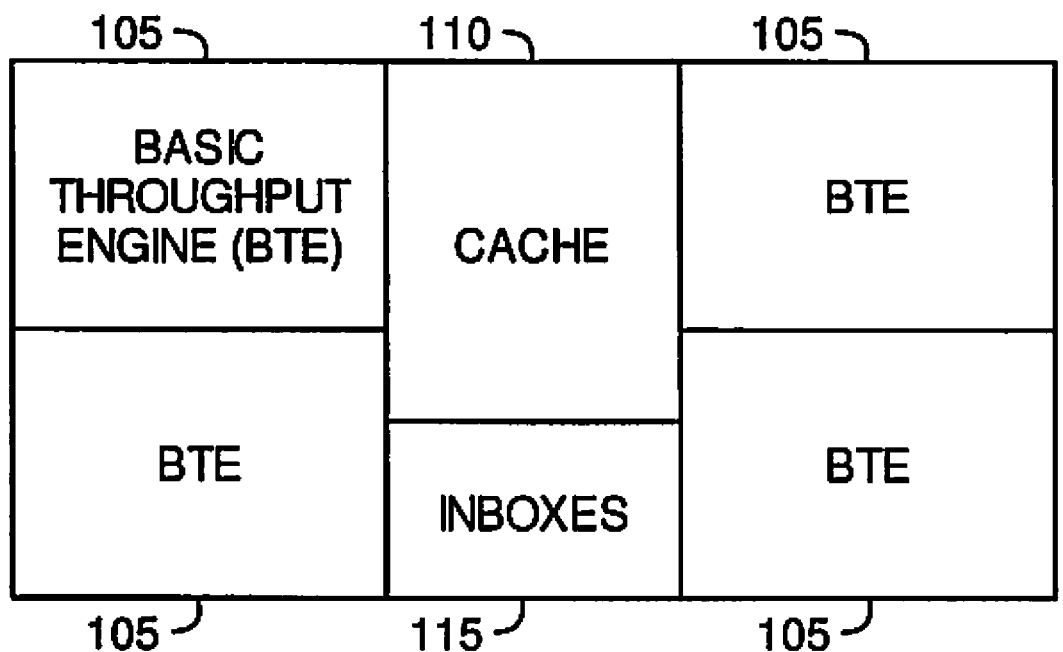
FIG. 1 is a block diagram depicting an exemplary computer processor, according to one embodiment of the invention.

Embodiments of the invention provide methods and apparatus to improve the performance of a ray tracing image processing system. One embodiment of the invention provides techniques for an image processing system to render an anti-aliased image while minimizing the increase in workload associated with anti-aliasing. According to one embodiment of the invention, by adaptively anti-aliasing an anti-aliased two-dimensional image may be rendered while minimizing increase in workload. According to one embodiment of the invention, the image processing system may adaptively anti-alias an image by detecting areas which may be susceptible to aliasing (e.g., areas of high contrast) and issuing additional rays into those areas. The image processing system may detect areas of high contrast by issuing initial rays into the three-dimensional scene, determining initial colors of pixels based on the intersections of the initial rays, and then comparing the initial colors of the pixels. The image processing system may then adaptively perform anti-aliasing by increasing the number of rays issued through pixels in the high-contrast areas. By increasing the number of rays issued into the three-dimensional scene only in areas of high contrast (i.e., areas likely to suffer distortion due to aliasing) an anti-aliased image may be rendered while minimizing the increase in workload.

According to another embodiment of the invention, the workload experienced by the ray-tracing image processing system may be reduced while the quality of the final image may be maintained. According to one embodiment of the invention, a reduction in workload which does not degrade image quality may be achieved by reducing the number of rays issued into areas of the three-dimensional scene which may have low contrast while maintaining the number of rays issued into the three dimensional scene which do not have low contrast. This may be referred to as adaptively sub-sampling the three-dimensional scene in areas of low contrast to reduce initial issued rays. The number of rays issued into the can be reduced in areas of low contrast without reducing quality, because additional rays issued through the pixels in areas of low contrast may make minimal (undetectable) changes to the color of the pixels in comparison to the color determined by preliminary rays. By maintaining the number of rays issued into areas of the three-dimensional scene which do not have low contrast while reducing the number of rays issued into areas of low contrast, the quality of the image rendered by the ray-tracing image processing system may be maintained while the workload experienced by the image processing system may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIG. 3, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTES. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three-dimensional scene. As described further below with regards to FIG. 6, according to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, and described further below with regards to FIG. 6, the vector throughput engines may then determine if the ray intersects a primitive contained within the bounding volume. The vector throughput engines may also perform operations relating to determining the color of the pixel through which the ray passed.

Figure 2:
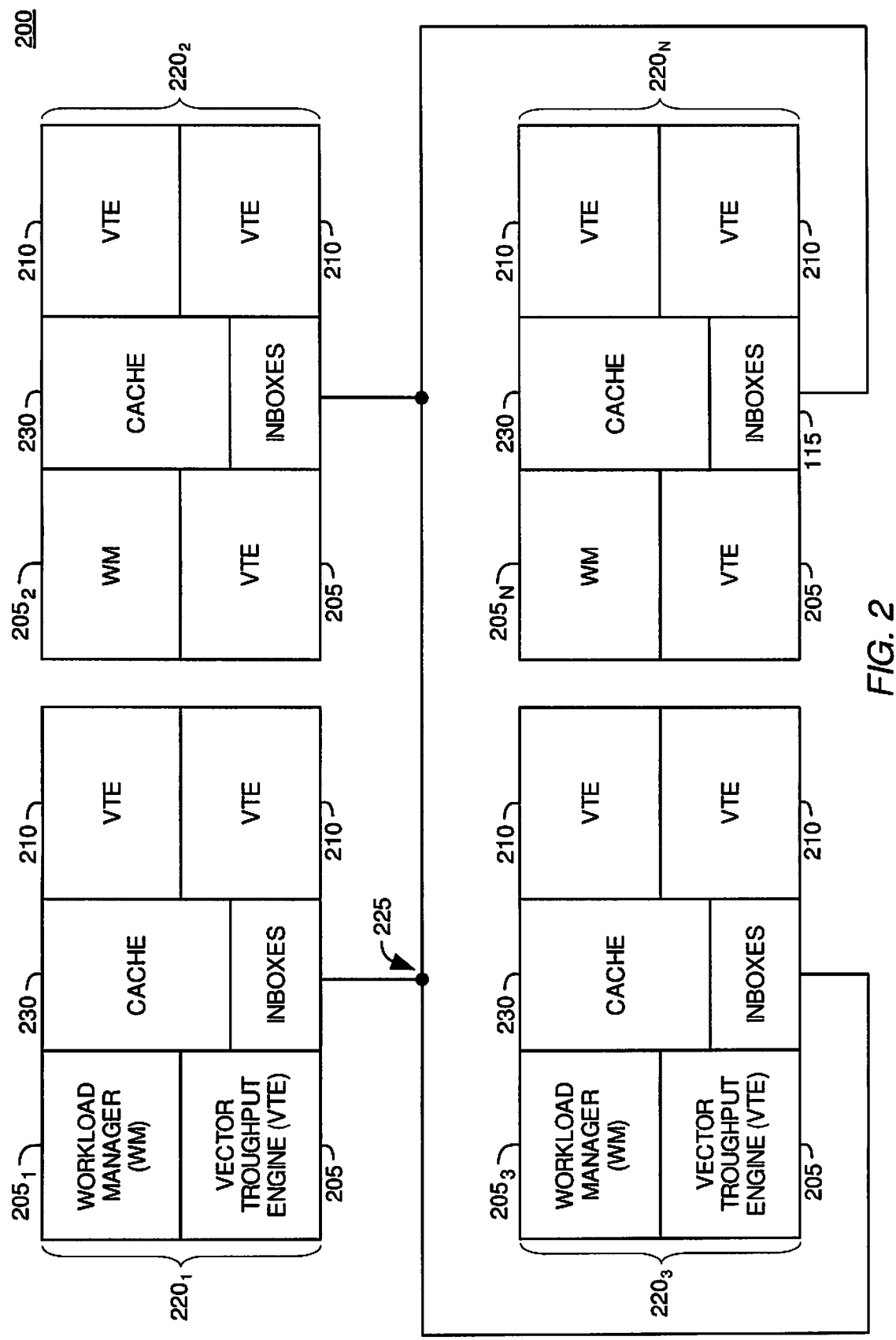
FIG. 2 illustrates a multiple-core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
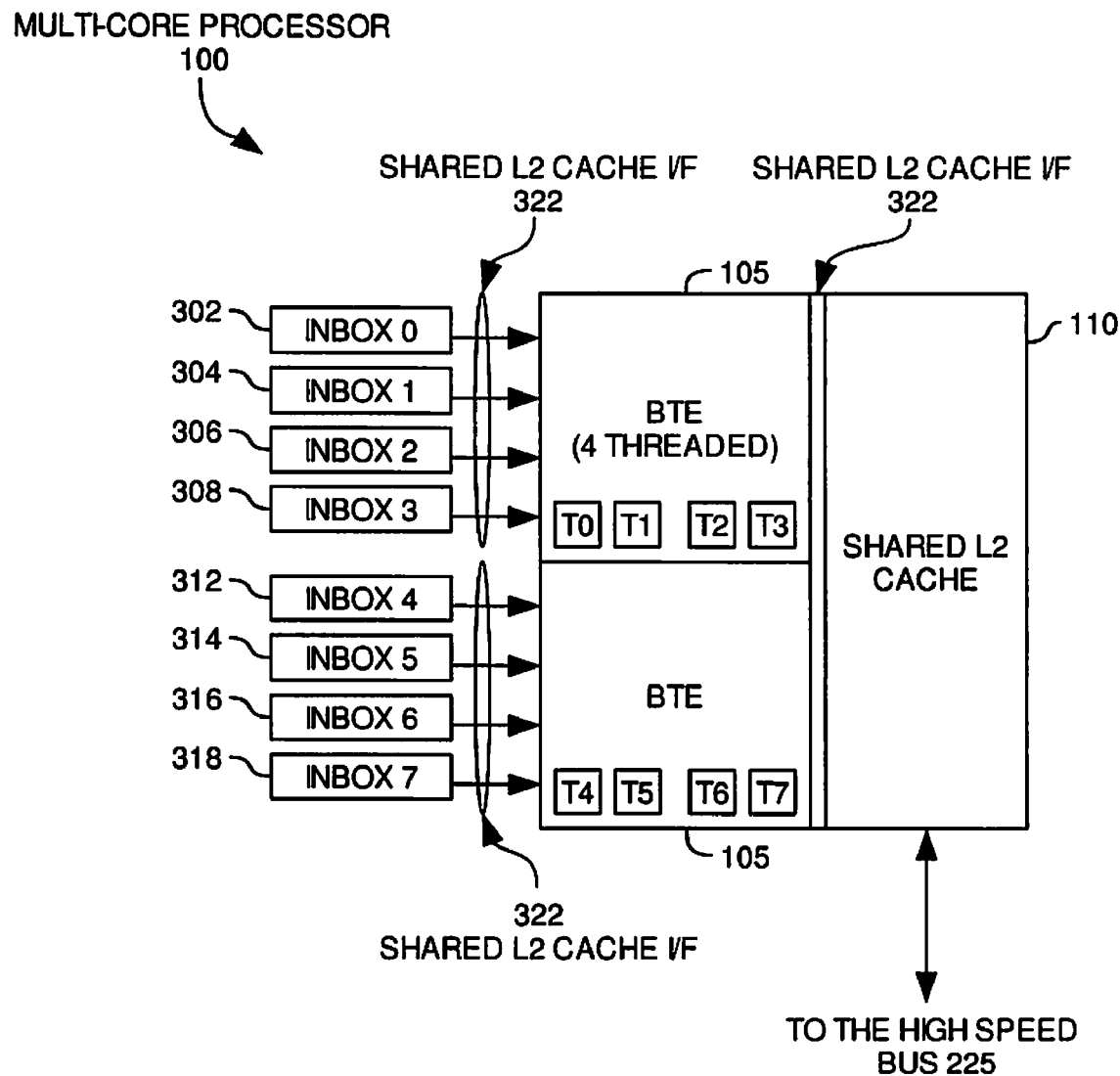
FIGS. 3A-3C are block diagrams illustrating aspects of memory inboxes according to one embodiments of the invention.

FIG. 3A is a block diagram of memory inboxes 302 . . . 318 in a multi-core processor element 100 according to one embodiment of the invention. The depiction of the memory inboxes 302 . . . 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 . . . 318. As described above, in some cases, each inbox 302 . . . 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 3B:
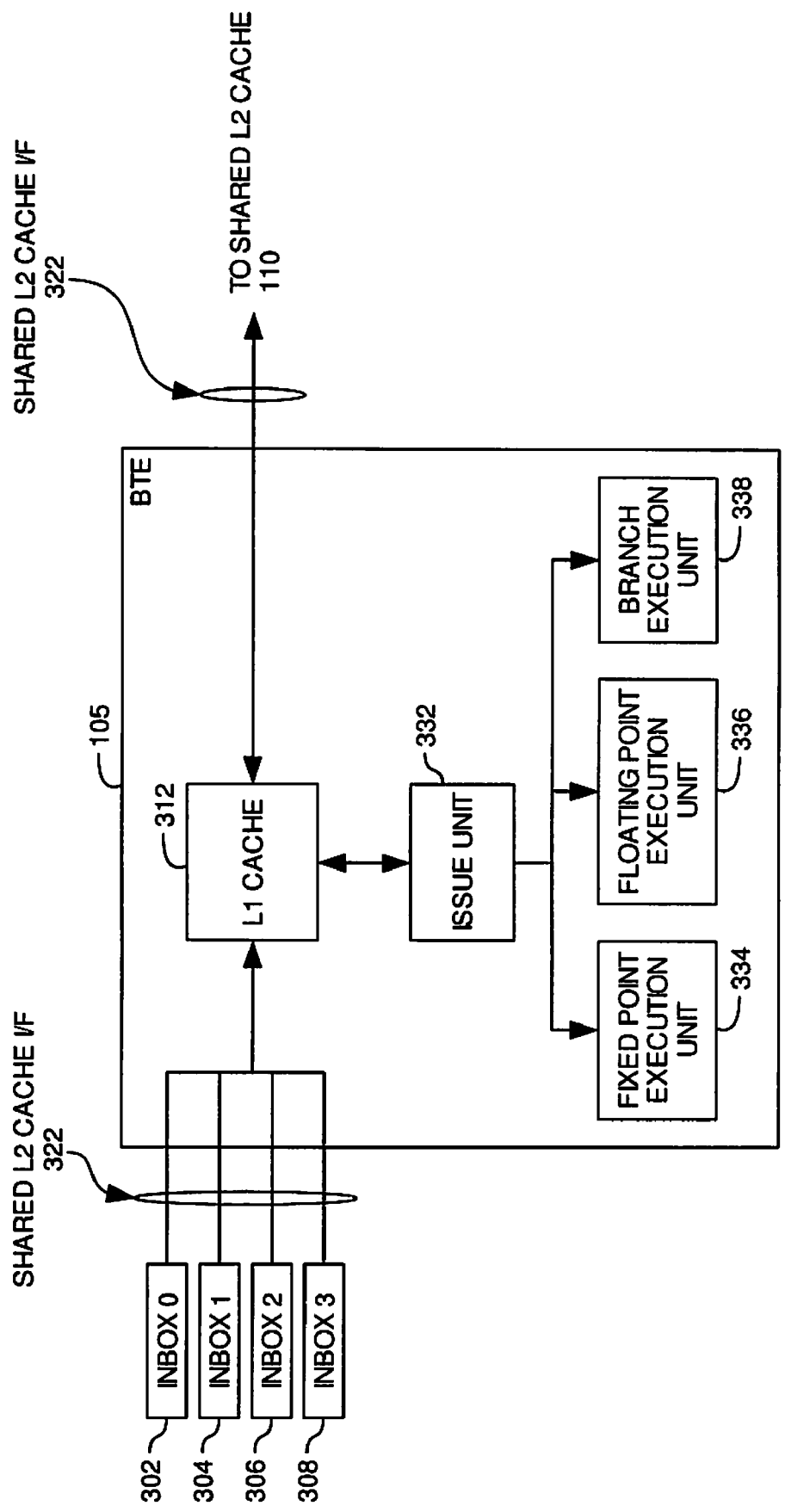

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Inboxes

Figure 3C:
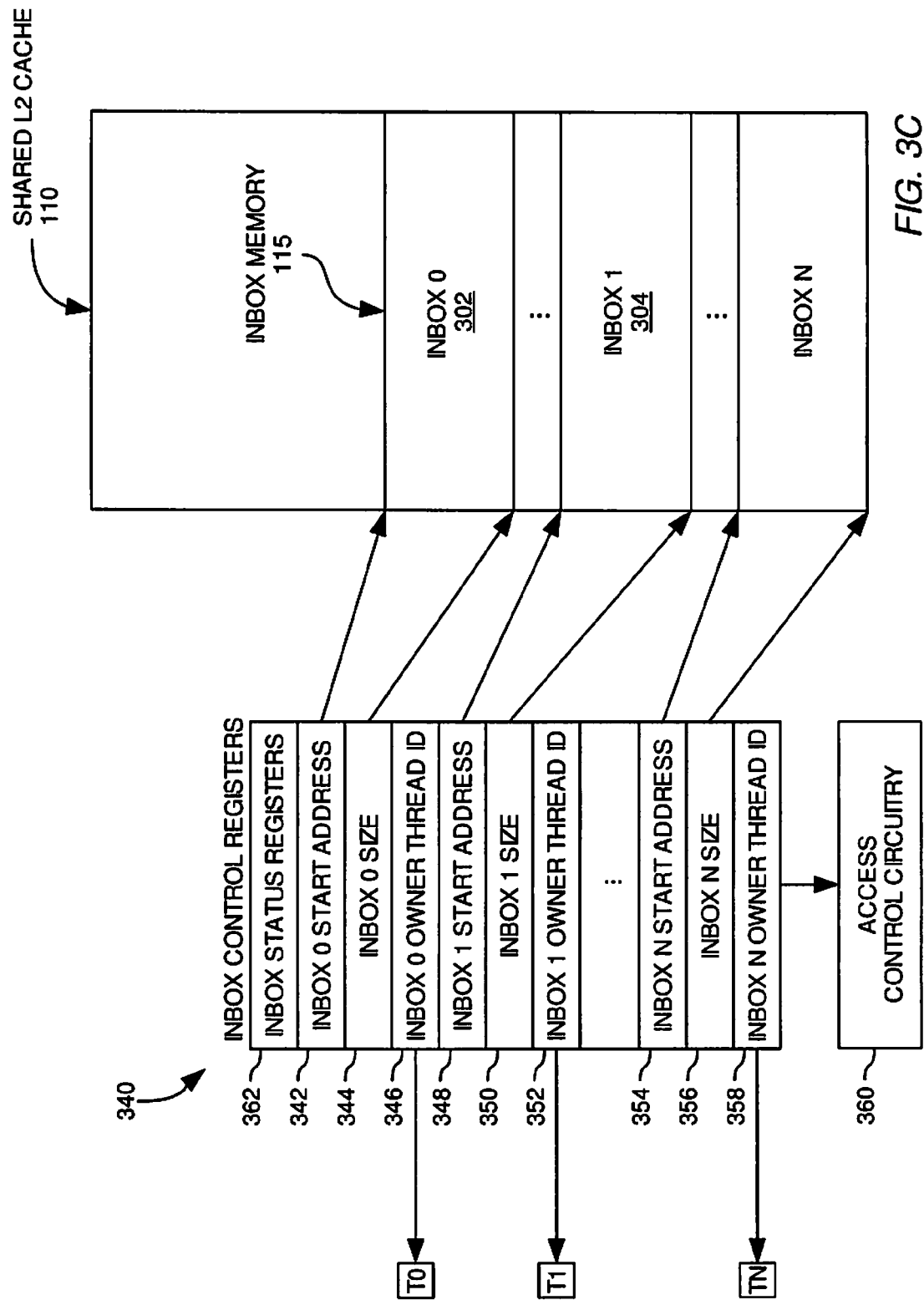

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
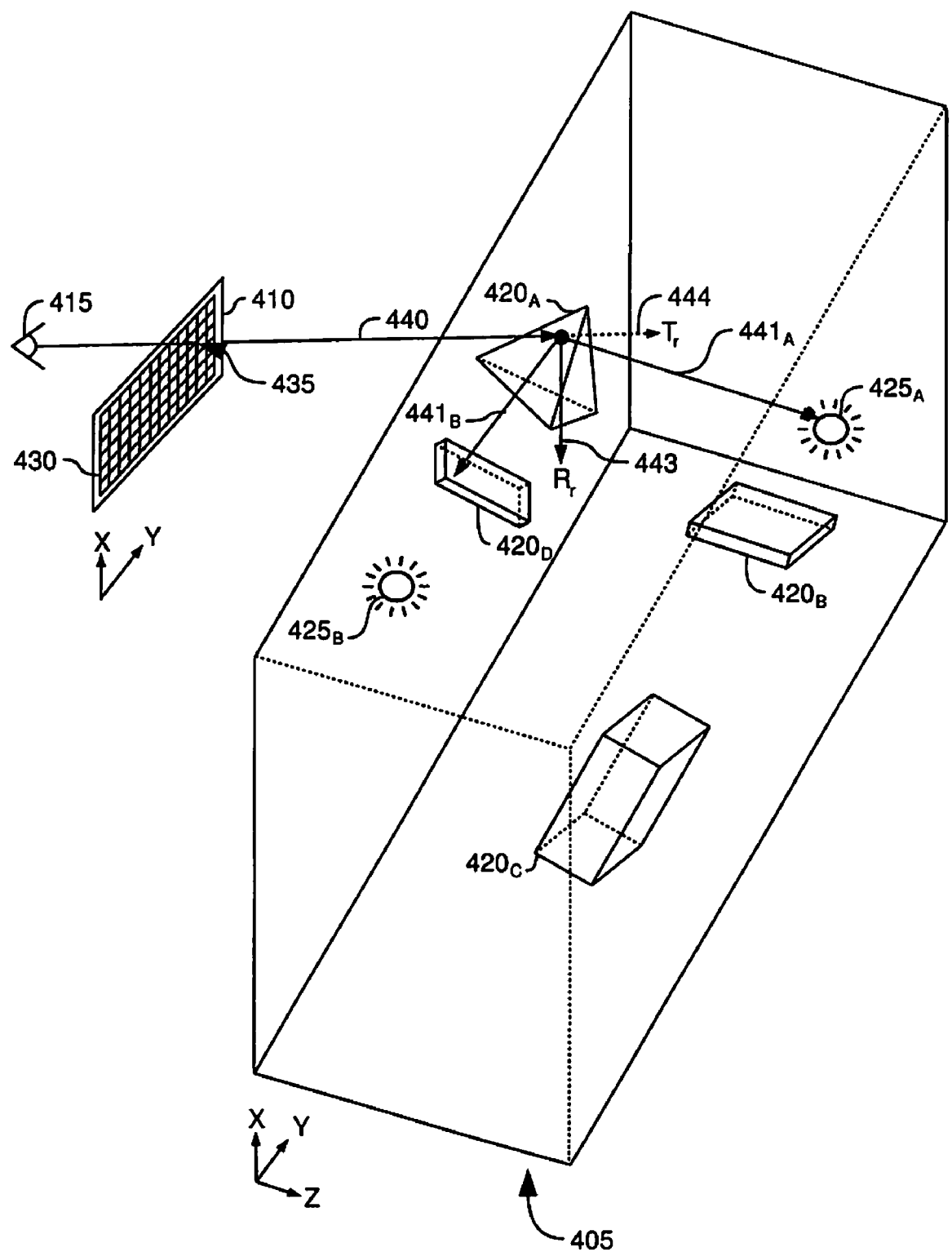
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid 420$_A$. Other objects in FIG. 4 are boxes 420$_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources 425$_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 (frame) of thousands (if not millions) of pixels to render the final scene on the monitor 410. Each individual pixel may display a different color to render the final composite two-dimensional picture on the monitor 410. An image processing system using a ray tracing image processing methodology to render a two dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray 441$_A$ may be issued from the point where original ray 440 intersected the object 420$_A$, and may traverse in a direction towards the light source 425$_A$. The shadow ray 441$_A$ reaches the light source 425$_A$ without encountering any other objects 420 within the scene 405. Therefore, the light source 425$_A$ will illuminate the object 420$_A$ at the point where the original ray 440 intersected the object 420$_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray 441$_B$ may be issued from the point where the original ray 440 intersected with the object 420$_A$, and may traverse in a direction towards the light source 425B. In this example, the path of the shadow ray 441$_B$ is blocked by an object 420$_D$. If the object 420$_D$ is opaque, then the light source 425B will not illuminate the object 420$_A$ at the point where the original ray 440 intersected the object 420$_A$. However, if the object 420$_D$ which the shadow ray is translucent or transparent the light source 4256 may illuminate the object 420$_A$ at the point where the original ray 440 intersected the object 420$_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object 420$_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object 420$_A$ which the original ray 440 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
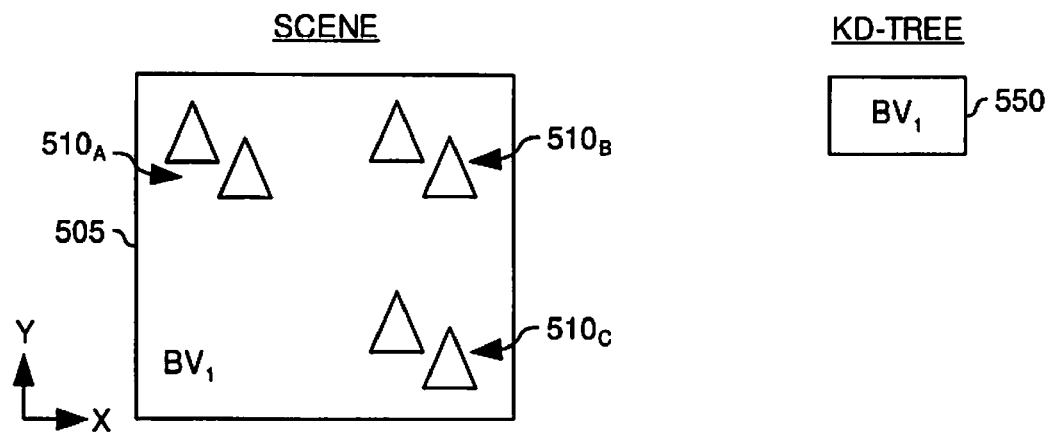
FIGS. 5A-5C illustrate a two dimensional space to be rendered by an image processing system and a corresponding spatial index created by an image processing system, according to one embodiment of the invention.
Figure 5B:
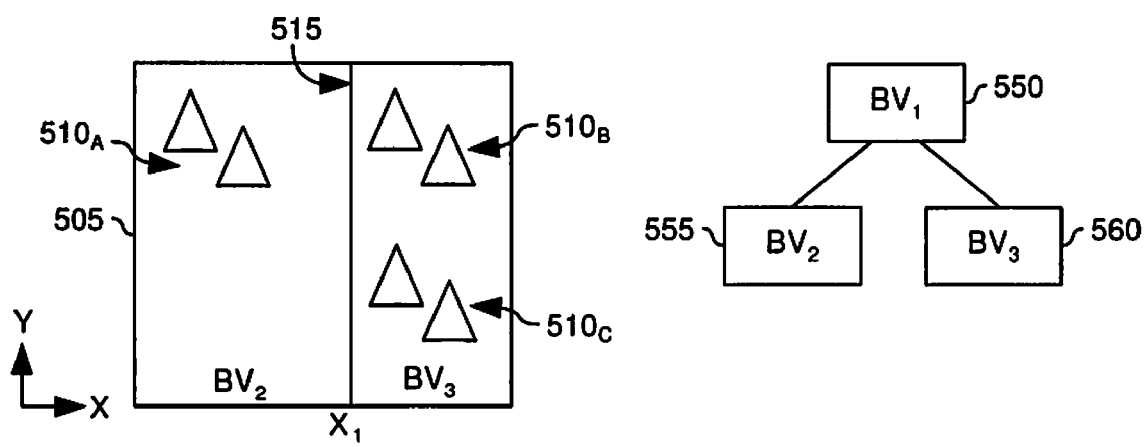
Figure 5C:
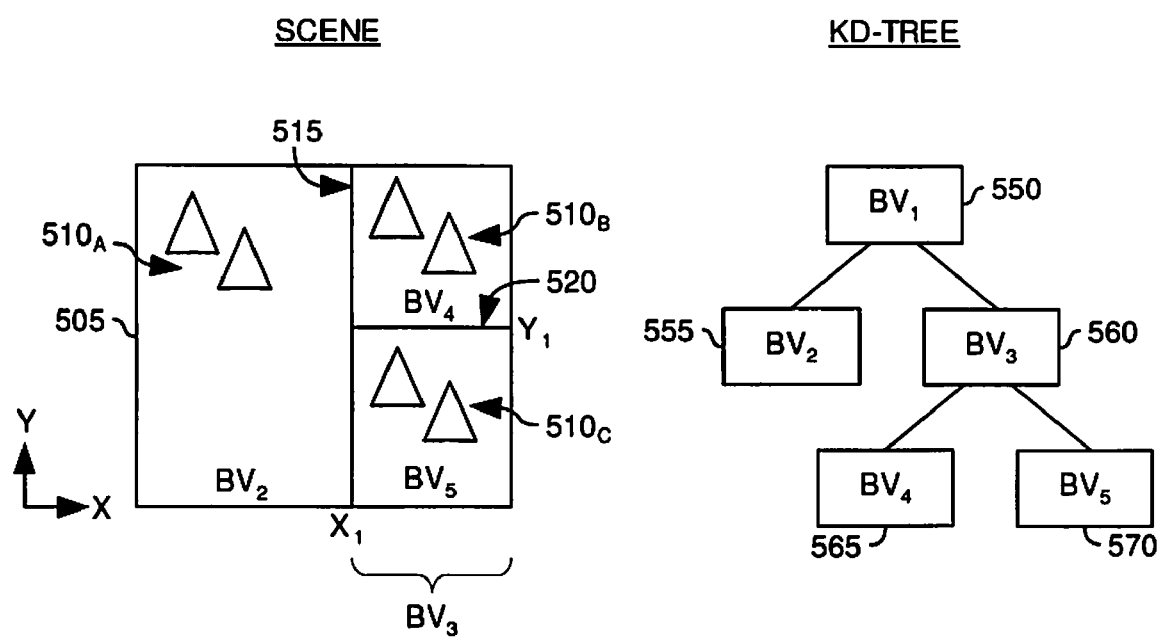

FIGS. 5A-5C illustrate a two dimensional space to be rendered by an image processing system and a corresponding kd-tree. For simplicity, a two dimensional scene is used to illustrate the building of a kd-Tree, however kd-Trees may also be used to represent three-dimensional scenes. In the two dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$, and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

Iterative Ray Tracing Algorithm

According to one embodiment of the invention, transforming the ray tracing algorithm from a recursive algorithm into an iterative algorithm may enable efficient distribution of workload related to ray tracing amongst a plurality of processing elements. An iterative ray tracing algorithm, in contrast to a recursive ray tracing algorithm, may allow separate processing elements to perform operations relating to determining the color of a single pixel and allow efficient use of processor resources (e.g., memory cache). Efficient distribution of workload amongst a plurality of processing elements may improve ray tracing image processing system performance.

An algorithm for performing ray tracing may be recursive in the sense that it issues an original ray into a three dimensional scene and finishes all ray tracing operations relating to the issued original ray (e.g., traces all secondary rays and performs all ray-object intersection tests) before issuing a subsequent original ray into the three dimensional scene.

For example, an image processing system may use a recursive ray tracing algorithm to render a two dimensional image from a three dimensional scene. The image processing system using a recursive ray tracing algorithm may use a processing element to perform ray tracing. The processor may be used to traverse a ray through a spatial index, and to determine if the ray intersects any objects within a bounding volume of the spatial index. If the ray intersects an object contained within a bounding volume, the image processing system, using the same processor, may issue secondary rays into the three dimensional scene to determine if they intersect any objects and, consequently, contribute color to the object intersected by the original ray. While performing operations related to determining if the secondary rays intersect objects within the three dimensional scene, the processor may store information defining the original ray in the processor's memory cache.

If the processing element determines that the secondary rays intersect objects within the three dimensional scene the image processing element may issue more secondary rays into the scene to determine if those secondary rays intersect objects and contribute color to the object intersected by the original ray. When performing calculations to determine if the secondary rays intersect objects within the three dimensional scene, the processor may store previous secondary ray information in the processor's memory cache. By issuing more and more secondary rays into the scene, the image processing system may finally determine the total contribution of color from secondary rays to the object intersected by the original ray. From the color of the object intersected by the original ray and the contribution of color due to secondary rays, the color of the pixel through which the original ray passed may be finally determined.

Although the recursive ray tracing algorithm determines the color of the pixel through which the original ray passed, each time the image processing system issues more secondary rays into the three dimensional scene, the recursive ray tracing image processing system places information which defines the previous rays (e.g., the original ray or previous secondary rays) into the memory cache of the processing element. The image processing system may store ray information in the cache in order to free registers which may be necessary to perform the calculations related to determining if the subsequent secondary rays intersect objects within the three dimensional scene. Consequently, the recursive ray tracing image processing system may place a large (relative to the size of the cache) amount of information into the processors memory cache for a single pixel.

By storing large amounts of ray information in the memory cache of the processor, there is little or no space in the processor's memory cache for information which defines the objects within the three dimensional scene (i.e., object geometry data). This information may need to be frequently fetched from main memory into the memory cache in order to perform operations to determine if the original or secondary rays intersect objects within the three dimensional scene (thereby "thrashing" the cache). Therefore, the limits of an image processing system which uses the recursive ray tracing technique may be limited by the access time to fetch information from main memory and place it in the processor's memory cache.

However, according to embodiments of the invention, the ray tracing algorithm may be partitioned into an iterative ray tracing algorithm. The iterative ray tracing algorithm may allow separate processing elements to perform portions of the ray tracing algorithm. By allowing separate processing elements to perform portions of the ray tracing algorithm, the amount of information which needs to be cached (e.g., original rays and secondary rays) may be reduced. Furthermore, according to embodiments of the invention, the iterative ray tracing algorithm may be used in conjunction with the low-latency high-bandwidth communications network and the shared memory cache 110 in order to improve the performance of a ray tracing image processing system.

The low-latency high-bandwidth communications network of inboxes, as described above with regards to FIGS. 3A-3C, may be used to pass or send data processing information (e.g., information defining original rays and secondary rays) which has little use when tracing subsequent rays or rendering subsequent frames, according to embodiments of the invention. In addition, according to embodiments of the invention, the ray tracing image processing system may use a shared coherent memory cache to store information which may be used by the image processing system when tracing subsequent rays or performing ray tracing for a subsequent frame.

Figure 6:
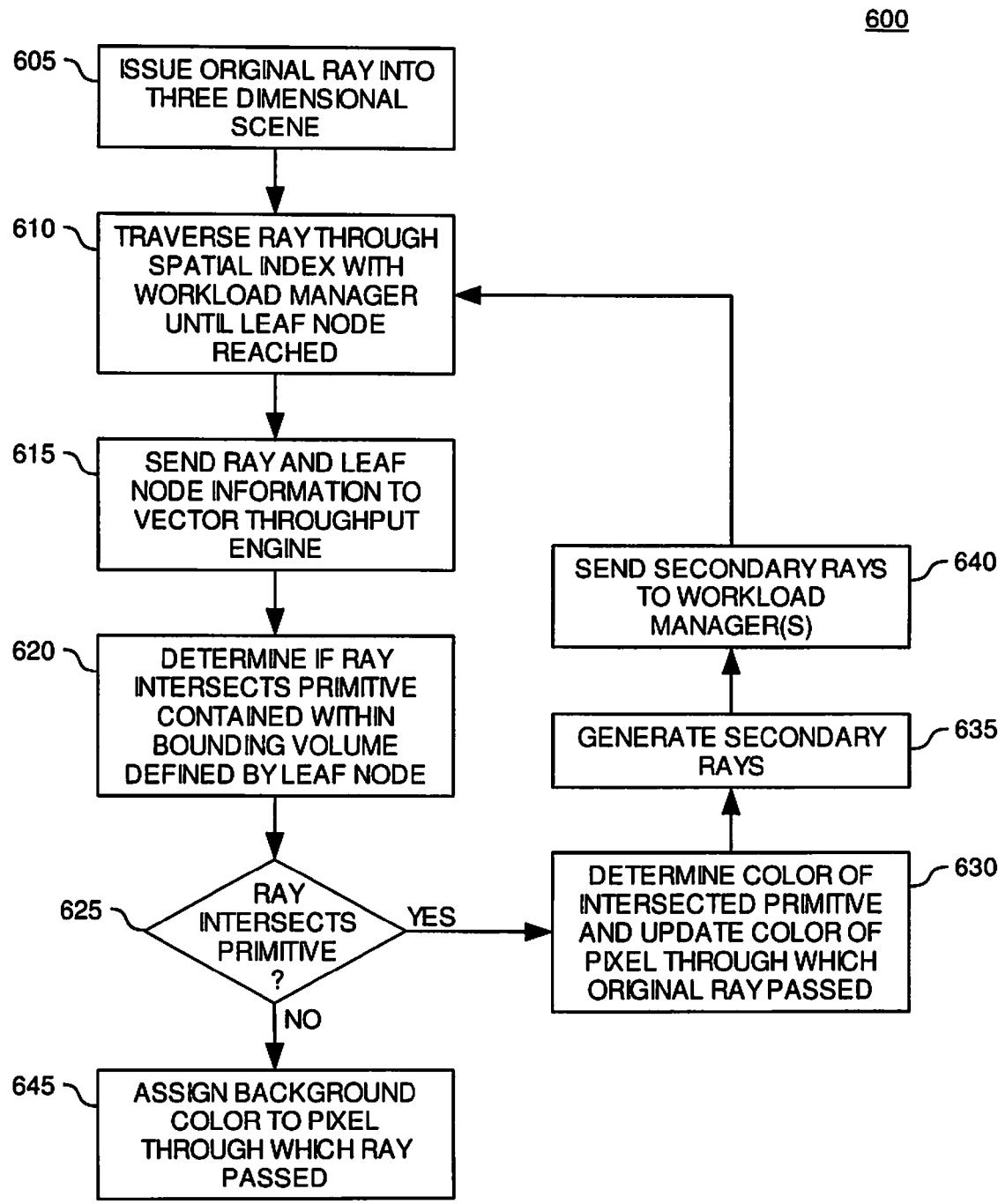
FIGS. 6, 9 and 12 are flowcharts illustrating exemplary methods of performing ray tracing, according to embodiments of the invention.

FIG. 6 is a flowchart which illustrates a partitioned and thus iterative ray tracing algorithm or method 600 which may be used in a multi processor image processing system, according to one embodiment of the invention. The method 600 begins at step 605 when the image processing system issues an original ray into the three dimensional scene. The original ray may pass through a pixel as it traverses into the three dimensional scene. The original ray may be used to determine the color of the pixel through which the original ray passed.

Next, at step 610 the image processing system may use a use a workload manager 205 processing element to traverse the spatial index (e.g., kd-Tree). The spatial index may be stored within the shared memory cache 110 of the image processing system. Traversing the kd-Tree may include performing calculations which determine if the original ray intersects bounding volumes which are defined by nodes within the spatial index. Furthermore, traversing the spatial index may include taking branches to nodes which defined bounding volumes intersected by the ray. A workload manager 205 may use the coordinates and trajectory of an issued ray (e.g., the original ray) to determine if the ray intersects bounding volumes defined by the nodes in the spatial index. The workload manager 205 may continue traversing the spatial index until the original ray intersects a bounding volume which contains only primitives (i.e., a leaf node).

At step 615, after the workload manager 205 has traversed the original ray to a leaf node, the workload manager 205 may send the original ray and information which defines the leaf node to a vector throughput engine 210. The workload manager 205 may send information which defines the original ray and the leaf node (e.g., trajectory of the ray, pixel through which the original ray passed, bounding volume defined by the leaf node, etc.) to the vector throughput engine 210. The workload manager 205 may send the information to the vector throughput engine 210 by writing the information defining the ray and the intersected leaf node to the inbox of the vector throughput engine 210.

By coupling the pixel information with the information which defines the original ray, there is no need to send the original ray back to the workload manager 205 if the vector throughput engine 210 determines that the ray intersected an object and, consequently, determines a color of the pixel. According to one embodiment of the invention, the vector throughput engine 210 may use the pixel information to update the color of the pixel by writing to memory location within a frame buffer (e.g., stored in the shared memory cache 110) which corresponds to the pixel. By updating the pixel color as secondary rays intersect objects within the three-dimensional scene, the number of rays relating to the same pixel that need to be stored (e.g., in cache memory) may be reduced.

After the workload manager 205 sends the original ray information to the vector throughput engine 210, the image processing system may issue a subsequent original ray into the three dimensional scene. The workload manager 205 may immediately begin traversing this subsequently issued original ray through the spatial index after the workload manager 205 has sent the original ray to a vector throughput engine 210. Thus, the workload manager 205 may be continuously traversing rays through the spatial index, rather than wait until the determination of whether the original ray intersected an object is complete, as in a recursive ray tracing algorithm. Furthermore, the workload manager 205 may be traversing rays through the spatial index as the vector throughput engine 210 is determining if previously issued rays intersect objects within the bounding volumes defined by leaf nodes. According to one embodiment of the invention, vector throughput engines 210 may be responsible for performing ray-primitive intersection tests. That is, the vector throughput engines 210 may determine if a ray intersects any primitives contained within the bounding volume defined by the leaf node.

Therefore, at step 620, a vector throughput engine 210 that receives the ray and leaf node information in its inbox may perform ray-primitive intersection tests to determine if the ray intersects any primitives within the bounding volume defined by the leaf node. The geometry which defines the primitives may be stored within the shared memory cache 110, and thus may not need to be fetched from main memory. By storing the geometry for primitives in the shared memory cache 110, the iterative ray tracing algorithm may not need to fetch the geometry from main memory as is the case with the recursive ray tracing algorithm. If the vector throughput engine 210 determines that the original ray intersected a primitive contained within the bounding volume defined by the leaf node, the vector throughput engine 210 may proceed to step 630.

At step 630, the vector throughput engine 210 may determine the color of the intersected primitive at the point which the original ray intersected the primitive. For example, the color of the primitive may be stored in the shared memory cache 110 and the vector throughput engine 210 may read the color information from the shared memory cache 210.

After determining the color of the primitive at the ray-primitive intersection point, the vector throughput engine 210 may update the color of pixel through which the ray passed. This may be accomplished, for example, by writing to a memory location within a frame buffer which corresponds to the pixel through which the original ray passed. By updating the pixel information as a ray-primitive intersection is determined and before determining the color contributions for all secondary rays relating to a original ray, the amount of information which may need to be stored in a memory cache may be reduced. In contrast, a recursive ray tracing algorithm may not store the color of the pixel in a frame buffer until all color contributions from secondary rays have been determined, which increases the amount of information which may need to be stored in a processor's memory cache.

After updating the pixel color, the vector throughput engine 210 may proceed to step 635, where, the vector throughput engine 210 may generate secondary rays. As described previously with regards to FIG. 4, a ray tracing image processing system may use secondary rays determine additional color contribution to the intersected object and thus to the pixel through which the original ray passed. Secondary rays may be, for example, reflected rays, transmitted (refracted) rays, or shadow rays. Generating secondary rays may include, for example, determining the trajectory of the secondary rays based on the trajectory of the original ray, surface properties of the intersected object, and an angle of intersection of the original ray with the intersected object.

After generating secondary rays, the vector throughput engine 210, at step 640 may send the secondary rays to a workload manager 205. The vector throughput engine 210 may send the secondary rays to a workload manager 205 by placing the information which defines the secondary rays (e.g., trajectory, information defining the pixel through which the original ray passed, etc.) in an inbox 115 of a workload manager 205. According to one embodiment of the invention, the vector throughput engine 210 may send the secondary rays to the workload manager 205 which traversed the original ray through the spatial index. However, according to another embodiment of the invention, the image processing system may contain a plurality of workload managers and the vector throughput engine 210 may send the secondary rays to a workload manager which did not traverse the original ray through the spatial index.

After sending the secondary rays to a workload manager 205, the vector throughput engine 210 may retrieve other information defining rays from an inbox which may be waiting to have ray-primitive intersection tests performed. The rays waiting in the vector throughput engine's 210 inbox may have been previously traversed through a spatial index by a workload manager 205. Therefore, the vector throughput engine 210 may perform more ray-primitive intersection tests to determine if rays (i.e., original or secondary) intersect objects within bounding volumes defined by leaf nodes. Thus, the vector throughput engine 210 may continuously perform operations related to ray-primitive intersection tests, determining primitive colors, updating pixel colors, and generating secondary rays.

After receiving a secondary ray from a vector throughput engine 210, a workload manager 205 may execute steps 610 and 615, as described above, to determine if the secondary ray intersects a leaf node.

Returning to step 625, if the vector throughput engine 210 determines that the ray did not intersect a primitive contained within bounding volume defined by the leaf node, the vector throughput engine 210 may assign the pixel through which the original ray passed a background color of the three-dimensional scene. The background color may be assigned to the pixel because the original ray did not intersect any primitives contained within the three dimensional scene. However, according to other embodiments of the invention, if the ray did not intersect any primitives contained within the leaf-node bounding volume, the vector throughput engine 210 may send the ray back to a workload manager 205 such that the workload manager 205 may traverse the ray through the spatial index again to determine if the ray intersected any other leaf nodes containing primitives.

Exemplary Use of an Iterative Ray Tracing Algorithm

Figure 7:
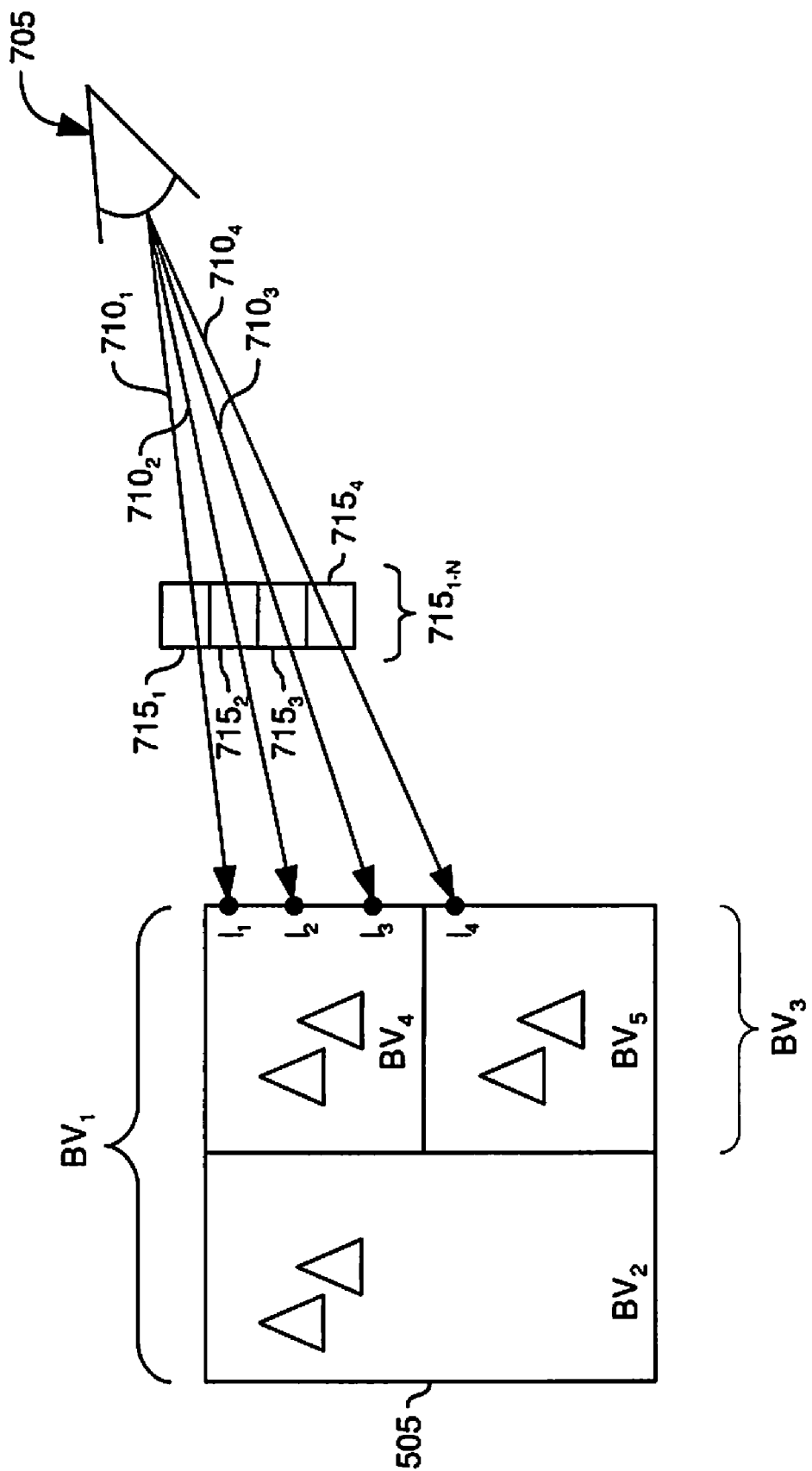
FIG. 7 is an exemplary three-dimensional space to be rendered by an image processing system, according to one embodiment of the invention.

FIG. 7 illustrates exemplary rays issued from an image processing system into a three dimensional scene 505, according to one embodiment of the invention. For clarity, the three dimensional scene 505 is the same as the three-dimensional scene used in FIGS. 5A-5C to illustrate the construction of a kd-tree. Therefore, the kd-tree which corresponds to the three dimensional scene 505 is the same as the kd-tree which was constructed with regards FIGS. 5A-5C. As illustrated in FIG. 7, a viewer 705 represents the origin of a plurality of original rays $710_{1-4}$ which may be issued into the three dimensional scene 505 by the image processing system. As each original ray $710_{1-4}$ is issued into the three-dimensional scene, the original rays may first pass through a corresponding pixel in a grid (frame) of pixels 715. Although only four pixels 715 and four original rays $710_{1-4}$ are illustrated in FIG. 7, to render a final two dimensional image from a three dimensional scene many more pixels may be necessary, and many more original rays may be issued.

A first original ray $710_1$ may be issued by the image processing system and pass through a first pixel $715_1$. The first original ray $710_1$ may intersect bounding volume 4 ($BV_4$) at an intersection point $I_1$. To facilitate understanding, the image processing system in this example may follow a pattern of issuing rays starting from the top of the grid of pixels 715 and continue issuing rays, one ray per pixel, moving down the grid of pixels until a ray has been issued for each pixel in the grid of pixels.

A second original ray $710_2$ and a third original ray $710_3$ may also be issued by the image processing system which may pass through a second pixel $715_2$ and a third pixel $715_3$ respectively. The second original ray $710_2$ and the third original ray $710_3$ may also intersect $BV_4$ at a second intersection point $I_2$ and a third intersection point $I_3$, respectively. Thus the first original ray $710_1$, the second original ray $710_2$, and the third original ray $710_3$ all intersect the same bounding volume. Furthermore, a fourth original ray $710_4$ may be issued by the image processing system and may pass through a fourth pixel $815_4$. The fourth original ray $710_4$, in contrast to the first three original rays $710_{1-3}$, may intersect bounding volume 5 ($BV_5$) at intersection point $I_4$.

Figure 8A:
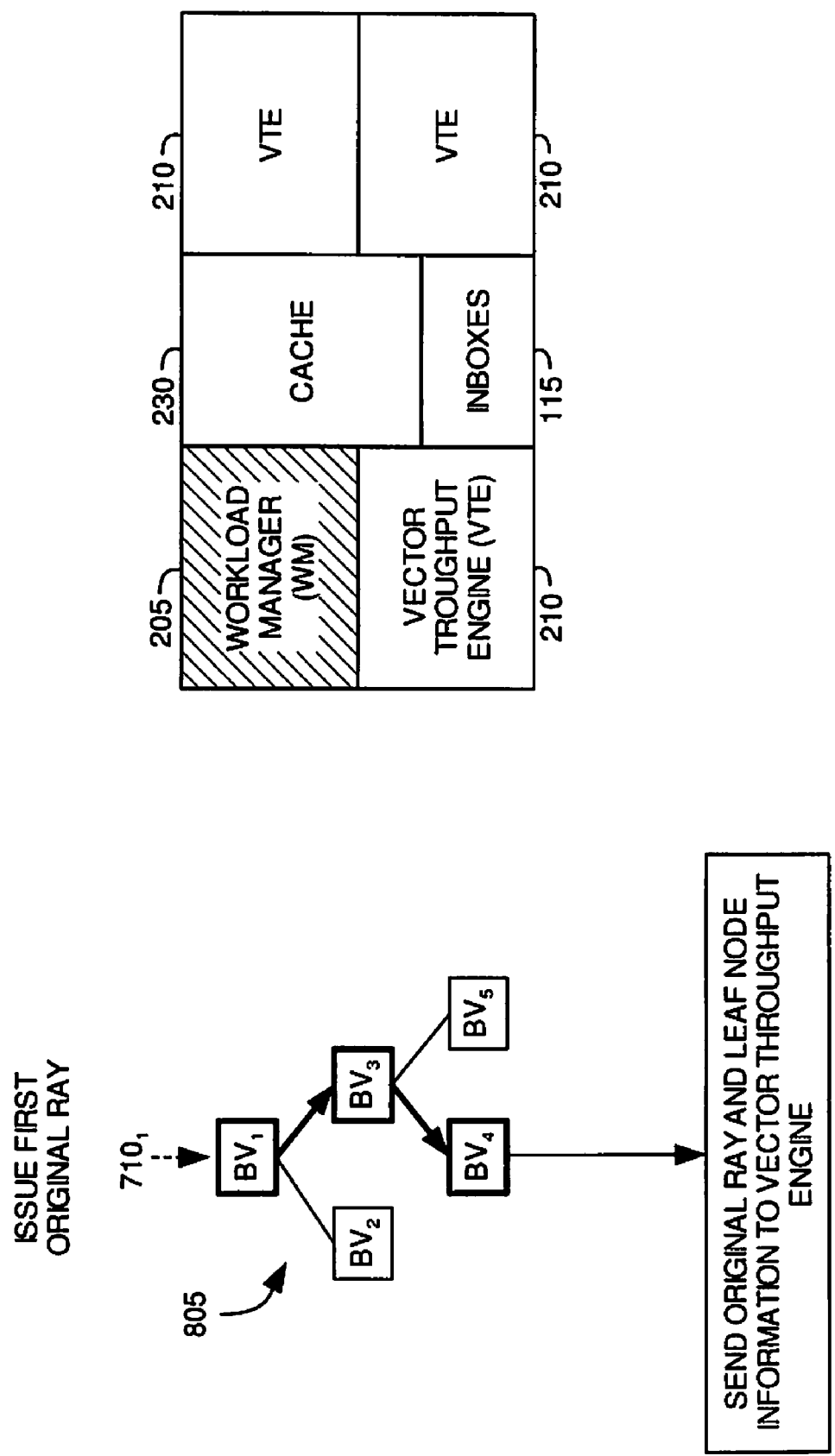
FIGS. 8A-8D illustrate a method of performing ray tracing, according to one embodiment of the invention.

FIG. 8A illustrates the traversal of the first original ray $710_1$ ray through a spatial index 805 (e.g., a kd-tree). Furthermore, as indicated by the shaded box 205, FIG. 8A illustrates a workload manager 205 performing operations related to the traversal of the first original ray $710_1$ through the spatial index 805. The workload manager 205 may traverse the ray through the spatial index 805 by taking branches to nodes defining bounding volumes intersected by the ray until a leaf node is reached (as illustrated in FIG. 8A by the darkened branches and nodes). As illustrated in FIG. 7 the original ray $710_1$ intersects $BV_4$, therefore, the workload manager 205 will traverse the first original ray $710_1$ to the leaf node which defines $BV_4$. After traversing the ray to a leaf node, the workload manager 205 may send the first original ray $710_1$ (e.g., send information which defines the first original ray $710_1$ and information which defines the pixel $715_1$ through which the first original ray passed) and information defining the intersected leaf node (i.e., $BV_4$) to a vector throughput engine 210.

According to embodiments of the invention, after the workload manager 205 sends the first original ray $710_1$ to a vector throughput engine 210, the workload manager 205 may begin traversing the second original ray $710_2$ through the spatial index. Thus, the workload manager 205 may be constantly traversing rays through the spatial index 805 while the vector throughput engines 210 are determining if rays intersect objects within the bounding volumes defined by traversed to leaf nodes.

Figure 8B:
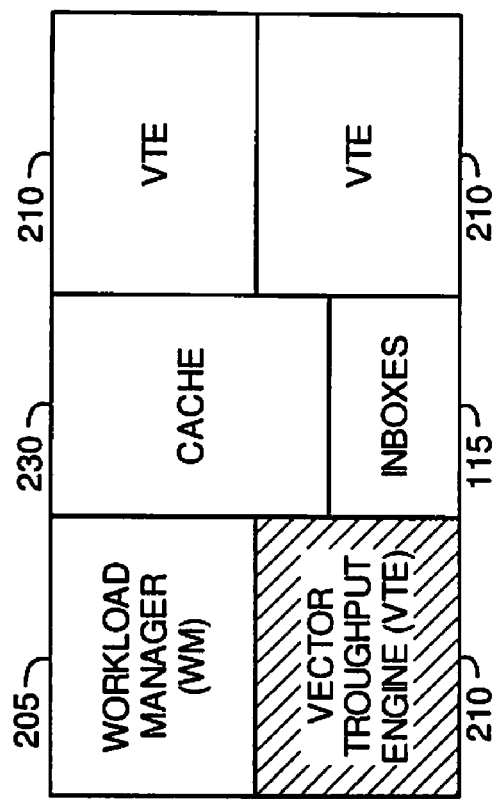
Figure 8B:
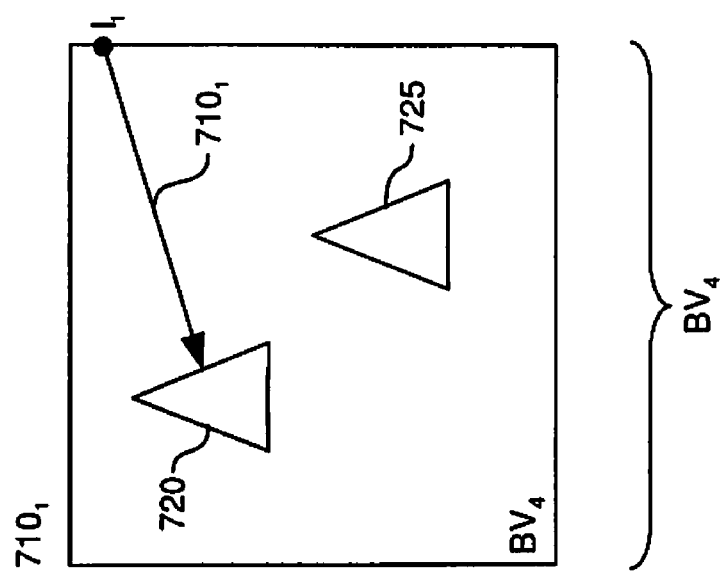

FIG. 8B illustrates the first original ray $710_1$ traversing through the bounding volume 4 (BV4). Furthermore, as indicated by the shaded box, FIG. 8B illustrates the vector throughput engine 210 performing ray-primitive intersection tests after the vector throughput engine has received the information defining the first original ray $710_1$ and the information defining the bounding volume $BV_4$. As described with regards to FIG. 6, the vector throughput engine 210 may execute ray-primitive intersection tests to determine if the original ray $710_1$ intersects primitives contained within the bounding volume $BV_4$.

The vector throughput engine 210 may perform tests with the first original ray $710_1$ against a first object 720 within the bounding volume $BV_4$, and against a second object 725 within the bounding volume $BV_4$. As illustrated in FIG. 8B, the vector throughput engine 210 may determine that the first original ray $710_1$ intersects the first object 720.

As described previously with respect to method 600, after determining that the first original ray $710_1$ intersects an object, the vector throughput engine 210 may determine the color of the first object 720 at the point which the first original ray $710_1$ intersected the first object 720. After determining the color of the object 720 at the intersection point, the vector throughput engine 210 may update the color of the pixel $715_1$ through which the first original ray $710_1$ passed (e.g., by writing to a frame buffer memory location which corresponds to the pixel $715_1$).

Figure 8C:
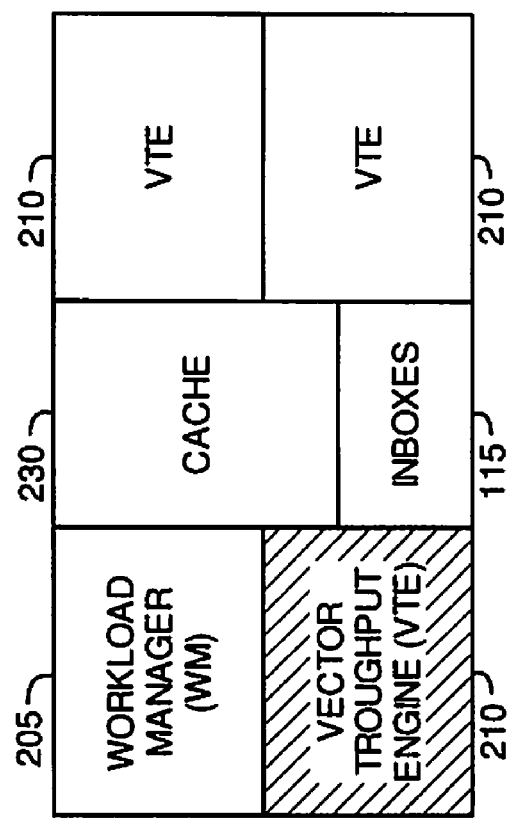
Figure 8C:
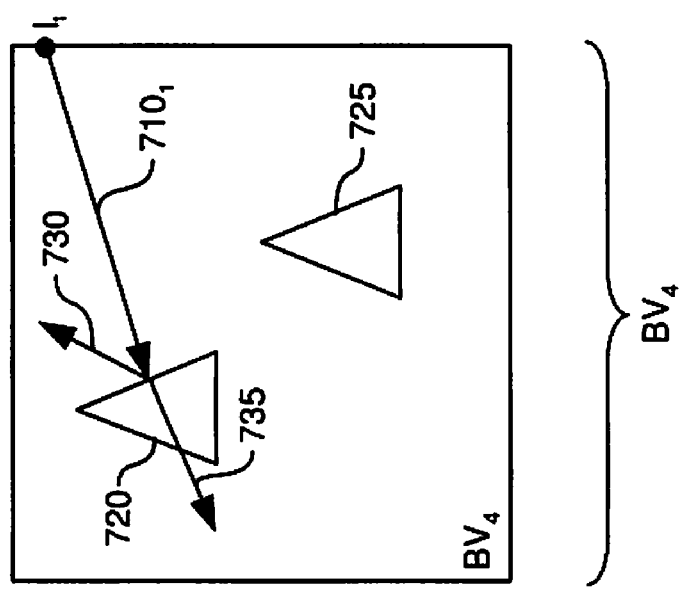

After determining the color of the object 720 at the intersection point, the vector throughput engine 210 may generate secondary rays. For example, as illustrated in FIG. 8C the vector throughput engine 210 may generate a reflected ray 730 and a transmitted (refracted) ray 735. Both secondary rays (730 and 735) originate from the point where the first original ray $710_1$ intersected the object 720. As described above, the secondary rays may be used to determine additional color contribution to the object at the point which the first original ray $710_1$ intersected the object 720. The generation of the secondary rays may include determining a trajectory for each secondary ray and tagging the secondary ray such that the additional color contribution from the secondary ray may be used to update the color of the pixel $715_1$ through which the first original ray $710_1$ passed.

Figure 8D:
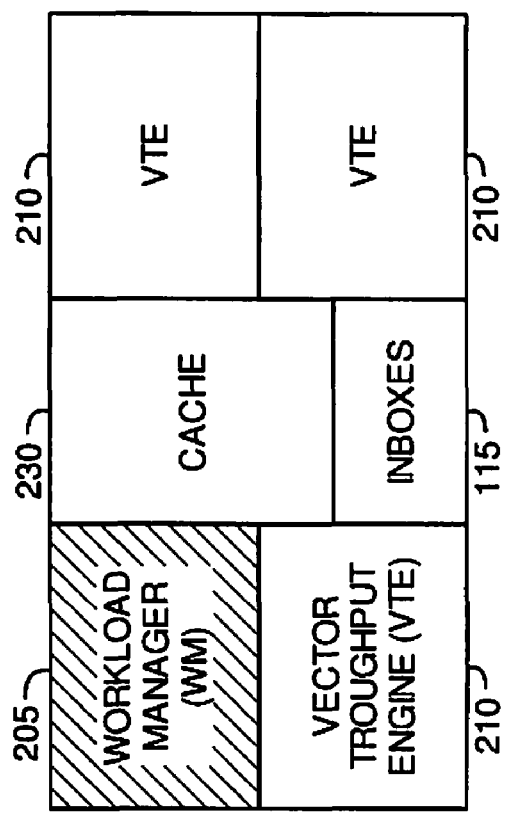
Figure 8D:
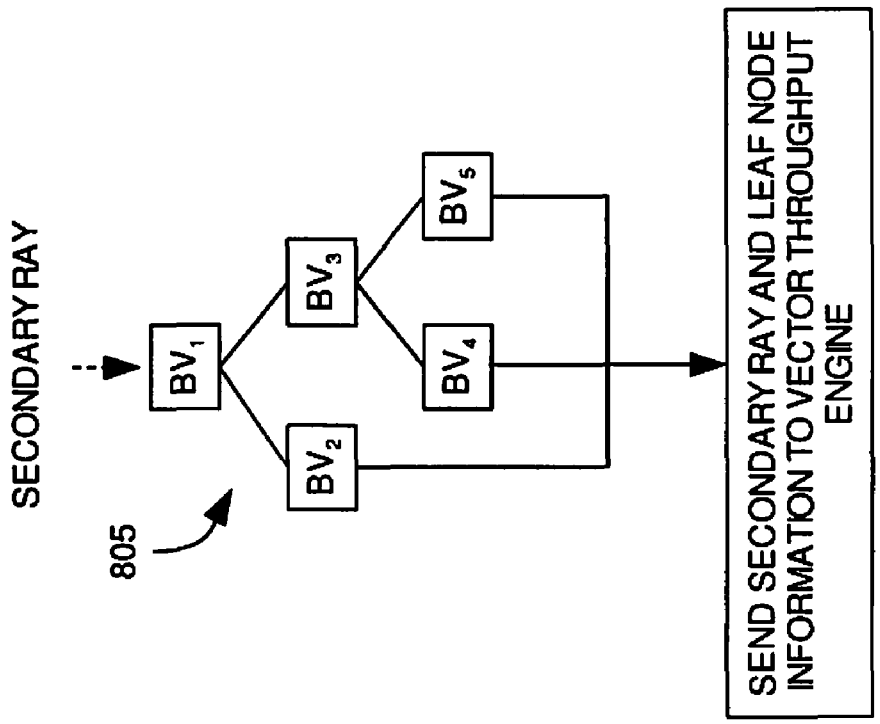

After generating the secondary rays (730 and 735), the vector throughput engine 210 may send the secondary rays (730 and 735), via an inbox, to a workload manager 205. A workload manager 205 which receives the secondary rays (730 and 735) may use the information which defines the secondary rays (i.e., trajectory of secondary rays) to traverse the spatial index 805. For example, the shaded box in FIG. 8D illustrates a workload manager 205 which may traverse the spatial index 805 with a secondary ray (e.g., 730) which was generated by a vector throughput engine 210. The workload manager 205 may traverse the secondary ray to a leaf node. After the secondary ray has been traversed to a leaf node, the workload manager 205 may send the secondary ray and information defining the bounding volume intersected by the secondary ray to a vector throughput engine 210 to determine if the secondary ray intersects any objects with the bounding volume intersected by the secondary ray.

As the vector throughput engines 210 determine that the original ray or secondary rays strike objects within the three dimensional scene, the color of the pixel through which the original ray passed may be updated within the frame buffer. According to embodiments of the invention, all secondary rays relating to an original ray, and thus to the pixel through which the original ray passed, may be traced through the three dimensional scene and their color contributions saved in the frame buffer to determine the final color of the pixel. However, according to other embodiments of the invention, a finite number of secondary rays relating to the original ray may be traced through the three dimensional scene to determine the color of the pixel. By limiting the number of secondary rays which are traced through the three dimensional scene and thus contribute to the color of the pixel, the amount of processing necessary to determine a final color of the pixel may be reduced.

Color Buffer Contrast Threshold for Adaptive Anti-Aliasing

A common problem with image processing systems (e.g., a ray tracing image processing system) is aliasing. Aliasing generally refers to distortion caused when sampling a signal. In ray tracing image processing the original signal to be sampled is the three-dimensional scene, and aliasing may be apparent in the two-dimensional image rendered by the image processing system. Aliasing may be more pronounced in the rendered image, for example, in areas where high contrast occurs. High contrast areas may occur along borders of objects within the three-dimensional scene. Aliasing may be displayed, for example, as jagged edges along the borders of the objects in the three-dimensional scene.

Image processing systems may use various techniques, commonly referred to as anti-aliasing, to reduce aliasing in the final rendered image. One anti-aliasing technique is to increase the number of samples taken from the original signal and then average the results from the samples. This technique may reduce aliasing distortion by obtaining a more accurate representation of the sampled signal. In a ray-tracing image processing system, increasing the number of samples taken may entail issuing more rays into the three-dimensional scene for each pixel in the frame. These additional rays may intersect objects within the three-dimensional scene and the total contribution of color from these additional rays may lead to a more accurate determination of the color of each pixel. A more accurate color determination for the pixels within the frame may reduce aliasing (e.g., jagged edges) in the final rendered image.

Although increasing the number of rays for each pixel in the frame may reduce distortion due to aliasing, issuing additional rays into the three-dimensional scene for each pixel in the frame may substantially increase the amount of workload necessary to render the final image. A larger workload may increase the amount of time required for the ray tracing image processing system to render the final two-dimensional image from the three-dimensional scene. An increased amount of time required to render images may result in visible loss of resolution or response when the image processing system is used in combination with other systems (e.g., a game system) to provide animation.

However, embodiments of the invention provide techniques for an image processing system to render an anti-aliased image while minimizing (or reducing) the increase in workload. According to one embodiment of the invention, by adaptively anti-aliasing, an anti-aliased two-dimensional image may be rendered while minimizing increase in workload. According to one embodiment of the invention, the image processing system may adaptively anti-alias an image by detecting areas which may be susceptible to aliasing (e.g., areas of high contrast) and issuing additional rays into those areas. The image processing system may detect areas of high contrast by issuing initial rays into the three-dimensional scene, determining initial colors of pixels based on the intersections of the initial rays, and then comparing the initial colors of the pixels to detect areas of high contrast. The image processing system may then adaptively perform anti-aliasing by increasing the number of rays issued through pixels in the high-contrast areas. By increasing the number of rays issued into the three-dimensional scene only in areas of high contrast (i.e., areas likely to suffer distortion due to aliasing) an anti-aliased image may be rendered while minimizing the increase in workload.

Figure 9:
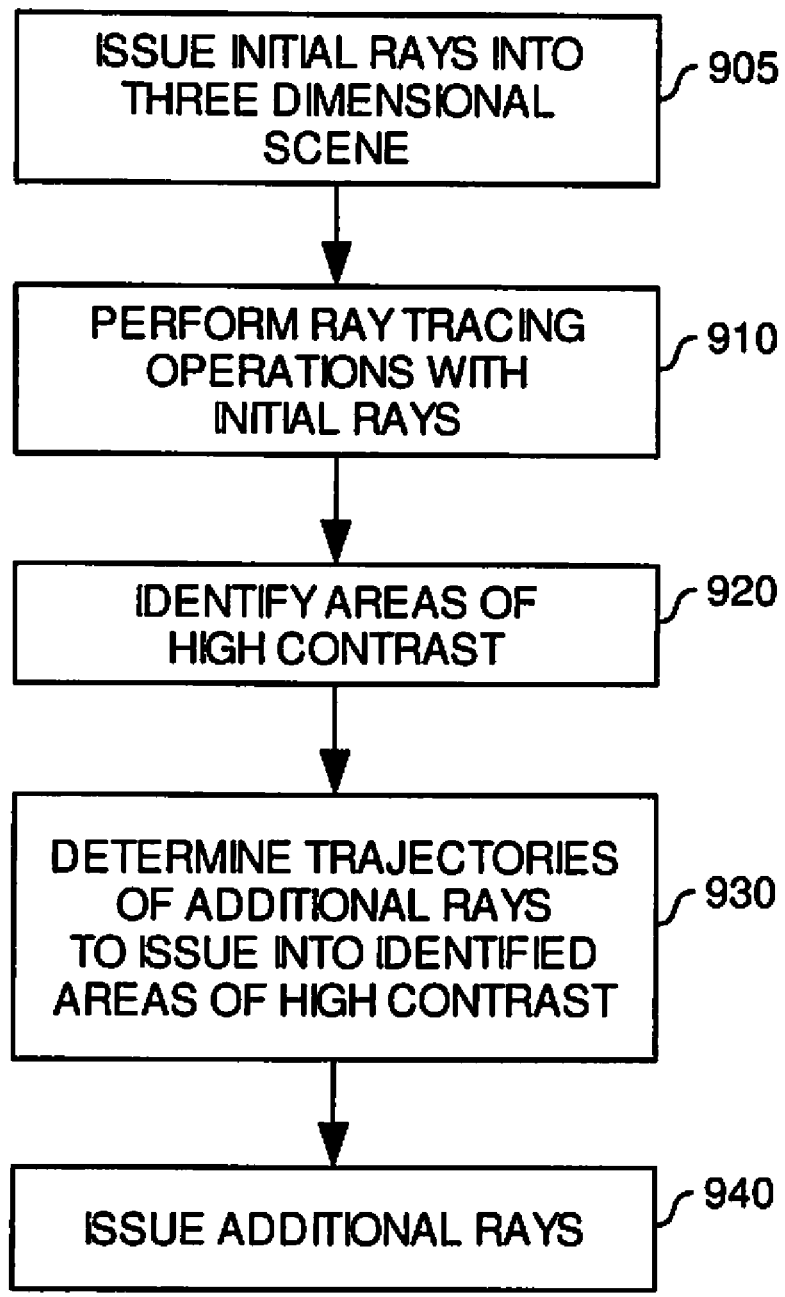

FIG. 9 is a flowchart illustrating an exemplary method 900 of performing ray tracing and adaptively anti-aliasing, according to one embodiment of the invention. The method 900 begins at step 905 where the image processing system (e.g., a workload manager 205) may issue initial rays into the three-dimensional scene. The initial rays may pass through a number of pixels as they traverse towards or into the three-dimensional scene.

The image processing system may issue a constant number of initial rays per pixel into the three-dimensional scene, according to embodiments of the invention. Although this constant number of initial rays may vary from implementation-to-implementation or from frame-to-frame, the number of initial rays issued per pixel in any given frame may be constant, for example, for each pixel in a particular frame. Each of the initial rays may pass through a specific point within each pixel. Consequently, the rays issued for each pixel may create a pattern of points as they pass through the pixel.

Figure 10:
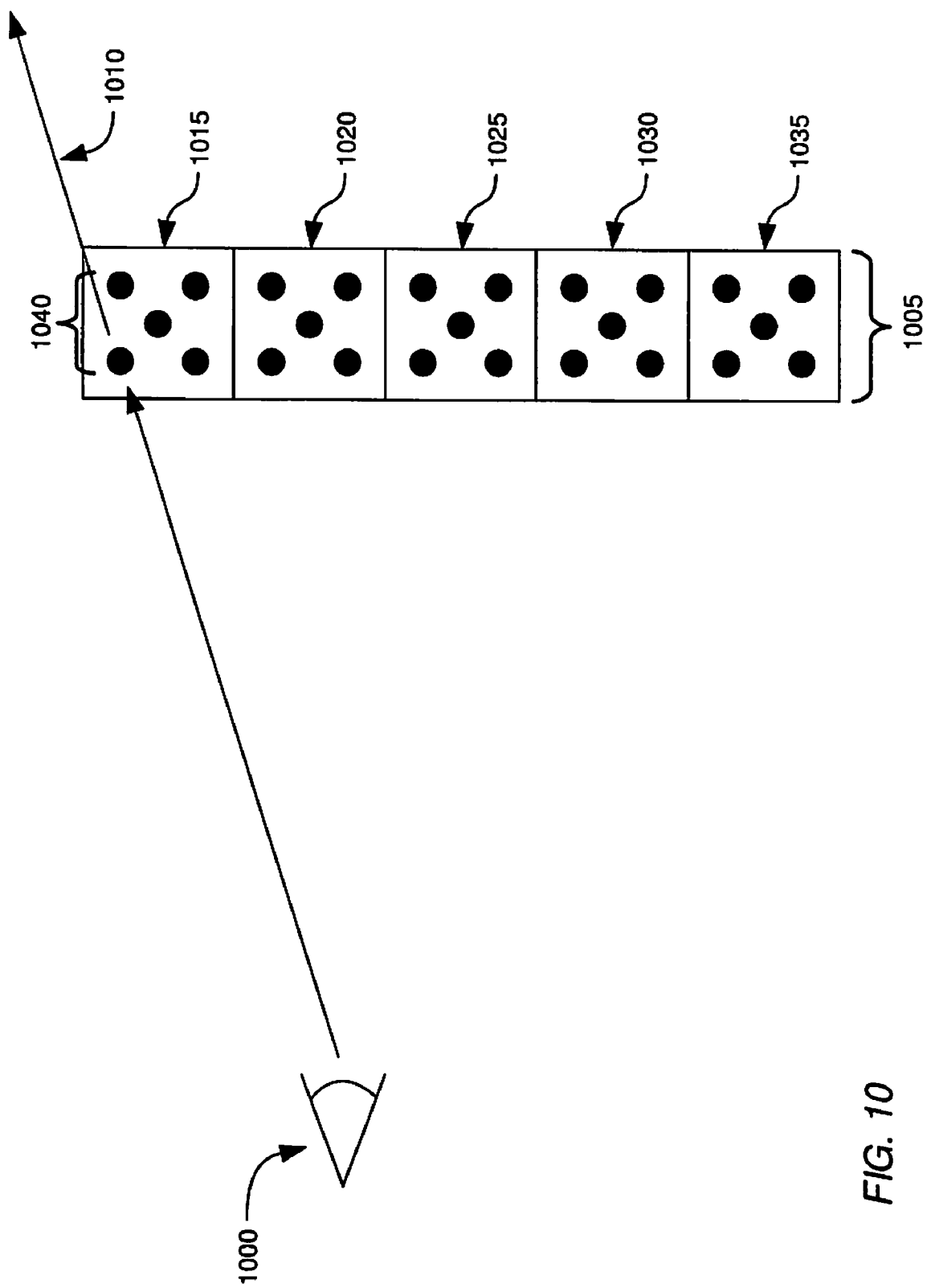
FIGS. 10, 11, 13, and 14 illustrate exemplary pixels in a frame to be rendered by a ray tracing image processing system, according to embodiments of the invention.

For example, FIG. 10 illustrates a series of pixels 1005 through which a plurality of initial rays may be issued by the image processing system. FIG. 10 also illustrates a point of view 1000 from which the rays may be issued and an exemplary ray 1010 which may be issued by the image processing system (e.g., by a workload manager 205). Five pixels (i.e., pixels 1015, 1020, 1025, 1030, and 1035) in the series of pixels 1005 may be a part of a larger grid of pixels which together make up a frame (e.g., the grid 430 of FIG. 4).

In the example illustrated in FIG. 10, a constant number of five initial rays may be issued through each pixel in the series of pixels 1005. A pattern of points 1040 through which the initial rays may pass through each pixel is illustrated in FIG. 10 by the shaded circles within each pixel.

After issuing the initial rays for each pixel in the frame, or while the image processing system is issuing initial rays into the three-dimensional scene, the image processing system may proceed to step 910, where the image processing system may perform ray tracing operations with the initial rays. This may include, for example, traversing the initial rays through a spatial index having nodes representing bounding volumes within the three dimensional scene (e.g., with a workload manager 205), performing ray-primitive intersection tests with the initial rays (e.g., with a vector throughput engine 210), and updating the color of the pixel according to objects the initial rays intersect within the three dimensional scene (e.g., with a vector throughput engine 210). The image processing system may update the color of a pixel by saving color information, for example, in a frame buffer. A frame buffer (color buffer) may be a two dimensional memory space (e.g., within the memory cache 110 or other suitable memory device) where the image processing system may store the color information for each pixel within the frame.

Once a sufficient amount of information is present within the frame buffer, the image processing system may identify areas of high contrast. A sufficient amount of information may be an amount of information which may allow the image processing system to determine if areas of high contrast exist within the three-dimensional scene. For example, two pixels may constitute a sufficient amount of information because the image processing system may compare the color of the two pixels to determine if an area of high contrast exists. However, other embodiments of the invention may have different thresholds for the number of pixels which have an initial color before determining that a sufficient amount of information exists within the frame buffer. For example, one embodiment of the invention may wait until every pixel within the frame buffer has an initial color.

The initial color for a pixel may be a color determined by an intersection of the initial ray and an object within the three dimensional scene or an intersection of the initial ray and the background of the three-dimensional scene. Consequently, the initial color may not be a final color of the pixel. A final color for a pixel may be determined by tracing all secondary rays generated in response to an intersection of the initial ray and an object through the three-dimensional scene and calculating the color contributions to the pixel from objects intersected by those secondary rays. Furthermore, the determination of a final color may also include performing ray tracing with additional rays as described below. The iterative ray tracing algorithm described above with regards to FIG. 6 enables the image processing system to use the initial colors of the pixels to determine if pixels contain colors of high contrast rather than waiting for a final color of a pixel to determine the pixel colors are of high contrast.

By using an initial color of a pixel to determine areas of high contrast rather than waiting until a final color of the pixel, the image processing system may determine relatively early on while performing ray tracing for a frame where areas of high contrast exist. The initial color of the pixel may be a good approximation of the final color of the pixel and, thus, may be a good indicator of areas of high contrast. By determining relatively early on where the areas of high contrast exist, the image processing system may begin adaptively anti-aliasing portions of the frame while performing ray tracing with other initial rays and/or secondary rays. This parallel anti-aliasing and ray tracing may reduce the time required to render an anti-aliased ray-traced image in comparison to waiting until pixels have final colors before beginning to anti-alias the image.

If a sufficient amount of information is not present in the frame buffer, the image processing system may continue performing ray tracing operations and updating the color of pixels within the frame buffer until a sufficient amount of information is present in the frame buffer. If a sufficient amount of information is present in the frame buffer, the image processing system may proceed to identify areas of high contrast at step 920.

To identify areas of high contrast, the image processing system may compare adjacent pixels within the frame buffer and determine if the adjacent pixels have colors of high contrast. The initial color of each pixel may be stored, for example, within the frame buffer. Therefore, the image processing system may compare the colors of the pixels by examining the color information stored within the frame buffer. Furthermore, according to embodiments of the invention, a threshold contrast may be set before the color comparison of the pixels commences. The threshold may define a degree of difference in color between two pixels which may constitute high contrast.

If the difference of the colors of the pixels being compared does not exceed the threshold contrast (i.e., the colors do not differ to such a degree to constitute high contrast), the image processing system may move or proceed to the next pixel to compare the next pixel with a pixel adjacent to the next pixel to determine if those pixels have colors of high contrast. By proceeding to the next pixel in the frame, when the color comparison indicates the pixels do not have high contrast colors, the image processing system effectively limits the number of rays issued through the pixels to the number of initial rays issued through the pixels.

For example, at step 920 the image processing system may determine, based on the initial colors, that pixel 1015 and pixel 1020 do not have colors which constitute high contrast. Consequently, the image processing system may not identify the corresponding area as high contrast and may proceed without issuing additional rays through pixel 1015. The step of not issuing additional rays through pixel 1015 minimizes the increase in workload for an anti-aliasing image processing system in comparison to an anti-aliasing image processing system which may have issued additional rays through pixel 1015 regardless of the amount of contrast between pixel 1015 and pixel 1020.

If the image processing system determines that the difference of the colors does exceed the threshold (i.e., the colors of the pixels differ to such a degree to constitute high contrast), the image processing system may proceed to step 930 to determine the trajectory of additional rays to issue into the three dimensional scene. The trajectory of the additional rays may be determined such that they may provide additional color information to the pixels being compared, and consequently provide anti-aliasing in the area of high contrast. The trajectory of the additional rays may be determined based on the position of the pixels which are being compared and the trajectories of the initial rays which were issued through the pixels being compared.

For example, the additional rays may be issued such that they pass through the pixels at points which may better discern the color of the pixels where aliasing effects may be most pronounced. For example, if two pixels have colors which differ enough to constitute high contrast, the image processing system may issue more rays into the three-dimensional scene close to or along the border of the two pixels being compared. Furthermore, the image processing system may issue additional rays which traverse through points within the pixels which prior issued initial rays have not passed. These trajectories may result in better anti-aliasing by determining the final color of each pixel in the areas most susceptible to aliasing.

Figure 11:
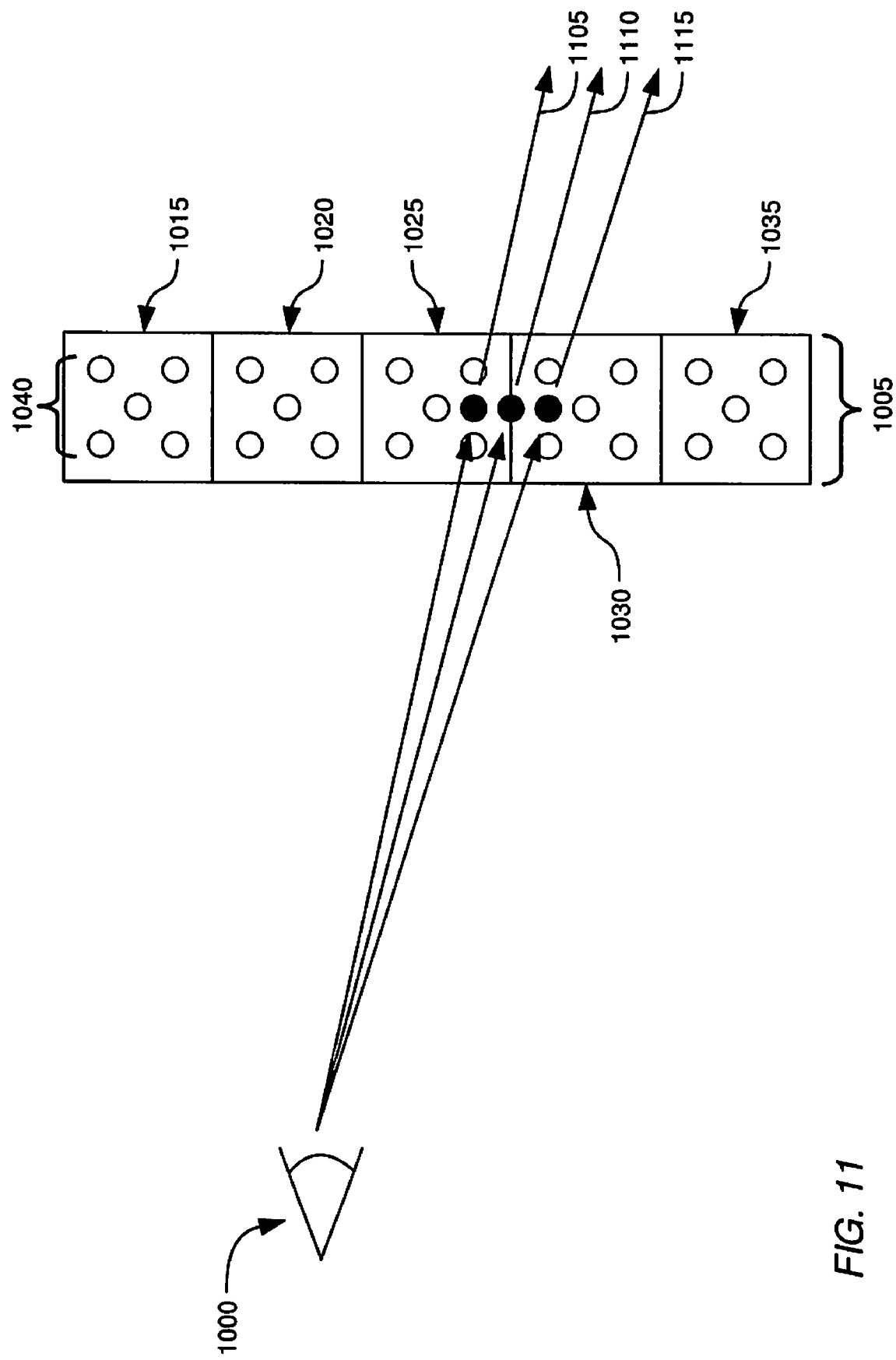

For example, the image processing system may determine at step 920 that pixel 1025 and pixel 1030 have initial colors which differ to such a degree to be considered high contrast. Consequently, in step 930 the image processing system may determine trajectories of additional rays to issue into the three-dimensional scene in order to determine a final color for pixel 1025 and 1030. For example, FIG. 11 illustrates three points though which the image processing system may issue three new rays into the three-dimensional scene. The three new points are illustrated in FIG. 11 as shaded circles within or bordering both pixel 1025 and pixel 1030, whereas the points through which the initial rays passed are illustrated in FIG. 11 by non-shaded circles. The trajectory of the additional rays (e.g., ray 1105, ray 1110, and ray 1115) may be such that they pass through the new points and into the three-dimensional scene.

After determining the trajectory of the additional rays, the image processing system may proceed to step 940 to issue the additional rays into the three dimensional scene. The image processing system may then perform ray tracing operations with the additional rays to determine if the additional rays may intersect objects within the three-dimensional scene. The objects intersected by the additional rays may aid in a more accurate determination of the final colors of the high contrast pixels (e.g., pixel 1025 and pixel 1030). The colors of objects intersected by the additional rays (and objects intersected by secondary rays generated in response to intersections of the additional rays and objects) may be, for example, combined or averaged with the colors of objects intersected by the initial rays (and any secondary rays generated in response to intersections of objects and the initial rays). This averaging of colors for each pixel may aid in a more accurate determination of a final color for the pixel (e.g., pixel 1025 and pixel 1030) and may reduce aliasing distortion in the final rendered image.

The image processing system may identify all of the areas of high contrast prior to issuing additional rays into the three-dimensional scene, or the image processing system may issue the additional rays into the three-dimensional scene for identified high-contrast areas as the image processing system is evaluating other areas (pixels) for high contrast colors.

For example, after, or while, issuing the additional rays into the three-dimensional scene, the image processing system may proceed to the next pixel in the frame. The image processing system may then evaluate the next pixel in the frame to determine if additional areas of high contrast exist in the three-dimensional scene by evaluating if the next pixel and a pixel adjacent to the next pixel have colors of high contrast.

By examining the initial colors of each pixel stored in a frame buffer for areas of high contrast and only issuing additional rays into areas of high contrast, the image processing system may render an anti-aliased image while maintaining a relatively reduced workload. The reduction in workload may be in contrast to an anti-aliasing ray tracing image processing system which may issue additional rays through every pixel in the frame rather than only in areas of the frame which have high contrast.

Adaptive Sub-Sampling for Reduction in Issued Rays

As discussed above, the number of rays issued into a three-dimensional scene by a ray tracing image processing system is directly related to the workload experienced by the image processing system. The more rays issued into a three-dimensional scene, the larger the workload experienced by the ray-tracing image processing system. Consequently, any reduction of the number rays issued into the three dimensional scene may reduce the workload experienced by the ray-tracing image processing system and may reduce the time necessary to render the two-dimensional image from the three-dimensional scene thereby improving performance. Reducing the time necessary to render the two-dimensional image may be desirable when the image processing system is used in conjunction with a system (e.g., a video game system) to provide animation requiring many frames to be rendered each second (e.g., 60 frames per second). However, a side-effect of reducing the number of rays issued into the three-dimensional scene may be a reduction in the quality of the final image rendered by the image processing system.

However, according to one embodiment of the invention, the workload experienced by the ray-tracing image processing system may be reduced while the quality of the final image may be maintained. By reducing the number of rays issued into areas of the three-dimensional scene which have relatively low contrast while maintaining the number of rays issued into the three dimensional scene which have relatively higher contrast. This may be referred to as adaptively sub-sampling the three-dimensional scene in areas of low contrast to reduce the number of initial issued rays. The number of rays issued into areas of low contrast can be reduced without reducing quality, because additional rays issued through the pixels in areas of low contrast may make minimal (undetectable) changes to the color of the pixels in comparison to the color determined by preliminary rays. By maintaining the number of rays issued into areas of the three-dimensional scene which do not have low contrast while reducing the number of rays issued into areas of low contrast, the quality of the image rendered by the ray-tracing image processing system may be maintained while the workload experienced by the image processing system may be reduced.

Figure 12:
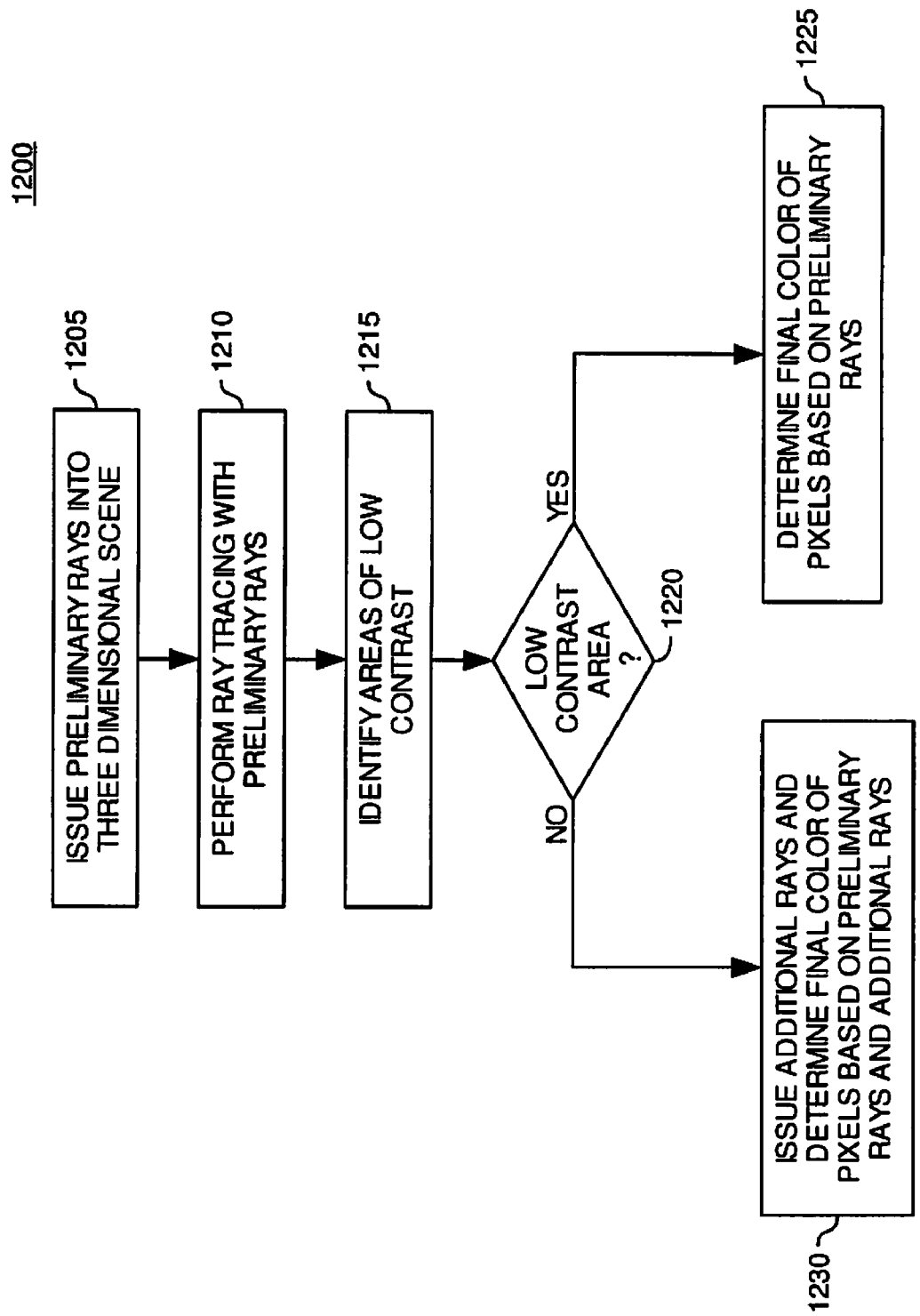

FIG. 12 is a flowchart illustrating an exemplary method 1200 of performing ray tracing while adaptively sub-sampling areas of the three-dimensional scene which may have low contrast, according to one embodiment of the invention. The method 1200 may begin at step 1205 where the image processing system may issue a number of preliminary rays into the three-dimensional scene. These preliminary rays may be used by the image processing system to determine an initial color of pixels within the frame. According to one embodiment of the invention, the image processing system may issue a single preliminary ray into the three-dimensional scene for each pixel.

Figure 13:
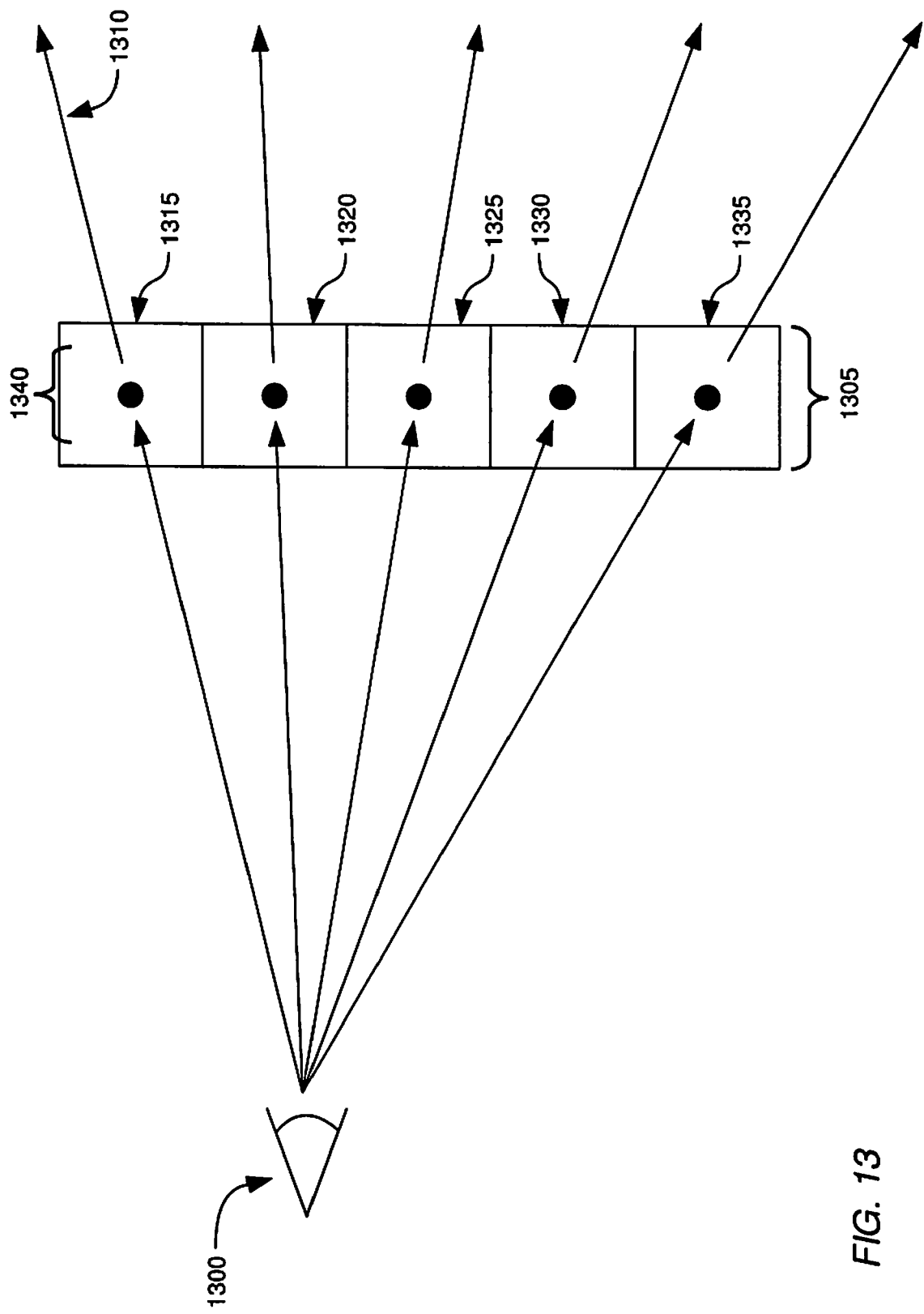

For example, FIG. 13 illustrates a series of pixels 1305 through which a plurality of preliminary rays may be issued by the image processing system. FIG. 13 also illustrates a point of view 1300 from which the rays may be issued and exemplary preliminary rays (illustrated in FIG. 13 as dashed arrows) which may be issued by the image processing system (e.g., by a workload manager 205). The five pixels (i.e., pixels 1315, 1320, 1325, 1330, and 1335) in the series of pixels 1305 may be a part of a larger grid of pixels which together make up a frame (e.g., grid 430 of FIG. 4). Within each pixel illustrated in FIG. 13 (i.e., pixels 1315, 1320, 1325, 1330, and 1335) is an exemplary point 1340 through which a preliminary ray passes.

Next at step 1210, the image processing system may perform ray tracing with the preliminary rays to determine an initial color for each pixel in the frame. This may include, for example, traversing the preliminary rays through a spatial index having nodes representing bounding volumes within the three dimensional scene (e.g., with a workload manager 205), performing ray-primitive intersection tests with the preliminary rays (e.g., with a vector throughput engine 210), and updating the color of pixels according to objects the preliminary rays intersect within the three dimensional scene (e.g., with a vector throughput engine 210). The image processing system may update the color of a pixel by saving color information, for example, in a frame buffer. A frame buffer may be a two dimensional memory space (e.g., within the memory cache 110 or other suitable memory device) where the color information for each pixel within the frame may be stored.

Once a sufficient amount of information is present within the frame buffer, the image processing system may identify areas of low contrast. A sufficient amount of information may be an amount of information which may allow the image processing system to determine if areas of low contrast exist within the three-dimensional scene. For example, two pixels may constitute a sufficient amount of information to determine if an area of low contrast exists because the image processing system may compare the color of the two pixels to determine if the pixels contain colors of low contrast. However, other embodiments of the invention may have different thresholds for the number of pixels which have an initial color before determining that a sufficient amount of information exists within the frame buffer. For example, one embodiment of the invention may wait until every pixel within the frame buffer has an initial color.

The initial color for a pixel may be a color determined by an intersection of the initial ray and an object within the three dimensional scene or an intersection of the initial ray and the background of the three-dimensional scene. Consequently, the initial color may not be a final color of the pixel. A final color for a pixel may be determined by tracing all secondary rays generated in response to an intersection of the initial ray and an object through the three-dimensional scene and calculating the color contributions to the pixel from objects intersected by those secondary rays. Furthermore, the determination of a final color may also include performing ray tracing with additional rays as described below. The iterative ray tracing algorithm described above with regards to FIG. 6 enables the image processing system to use the initial colors of the pixels to determine if pixels contain colors of low contrast rather than waiting for a final color of a pixel to determine the pixel colors are of high or low contrast.

By using an initial color of a pixel to determine areas of low contrast rather than waiting until a final color of the pixel, the image processing system may determine relatively early on in performing ray tracing for a frame where areas of low contrast exist. This is due to the secondary rays contributing relatively small amounts of change in the color of the pixel, and thus the initial color of the pixel may be very close to the final color of the pixel. By determining relatively early on where the areas of low contrast exist, the image processing system may determine where additional rays may need to be issued relatively early on in the ray tracing process, thereby reducing the overall time to render the image.

If a sufficient amount of information is not present in the frame buffer, the image processing system may continue performing ray tracing operations and updating the color of pixels within the frame buffer until a sufficient amount of information is present in the frame buffer.

Once there is sufficient information in the frame buffer, the image processing system may proceed to step 1215 where the image processing system may identify areas of low contrast within the frame, for example, by comparing the colors of adjacent pixels in the frame. The initial color of each pixel may be stored, for example, within the frame buffer. Therefore, the image processing system may compare the colors of the adjacent pixels by examining the color information stored within the frame buffer. The determination of whether or not the pixels have colors of low contrast may be based on a threshold color difference. The threshold color difference may define a maximum amount of difference between the colors of two pixels for the colors of the pixels to still be considered low contrast. If the two pixels have colors which are the same or similar (similar within a range determined by the threshold difference), the image processing system may identify a corresponding area of the frame as low contrast and move to evaluate other areas (pixels) of the frame to determine if other areas of low contrast exist.

The image processing system may identify all of the areas of low contrast in the frame before proceeding to step 1220, or may proceed to step 1220 as the image processing system is examining the colors of other areas within the frame. At step 1220 the image processing system may determine, based on the prior identification of a low contrast area if a pixel is in a low contrast area, if so the image processing system may proceed to step 1225 where the final color of the pixel may be determined based on ray tracing performed with the preliminary ray (e.g., objects intersected by the preliminary ray or objects intersected by secondary rays generated from intersections of the preliminary ray and an object/primitive). By determining the final color of pixels in low contrast areas without issuing additional rays into the scene through, the image processing system may reduce the workload experienced by the image processing system. This reduction in workload is in contrast to a ray tracing image processing system which may issue a constant number of rays per pixel (e.g., system which issues more than one ray per pixel) into the three dimensional scene regardless of whether or not two pixels contain colors of low contrast. Furthermore, by not issuing additional rays into the scene for pixels containing low contrast, the image processing system does not reduce the quality of the rendered image, because issuing additional rays may make minimal (indiscernible) improvement in the quality of the image in areas of low color contrast.

However, if the image processing system determines at step 1220 that the pixel is not in a low contrast area, the image processing system may proceed to step 1230 to issue additional rays through the pixel and to determine a final color of the pixel based on the preliminary ray and the additional rays. The image processing system may determine a final color of a pixel in a non low-contrast area by combining the colors encountered by the preliminary ray, colors encountered by secondary rays generated after an intersection of the preliminary ray and an object, colors encountered by the additional ray (or rays), and secondary rays generated after an intersection of the additional ray (or rays) and an object (or objects).

The image processing system may issue additional rays into the three dimensional scene at step 1230 to make a more accurate determination of the final color of the pixel in a non low-contrast area. By issuing additional rays into the three-dimensional scene for pixels which do not have the same or similar color, the image rendered by the image processing system does not lose quality in non low-contrast areas. After issuing the additional rays into the three-dimensional scene, the image processing system may begin performing ray tracing with the additional rays to determine additional color contributions to the pixel from the additional rays.

Figure 14:
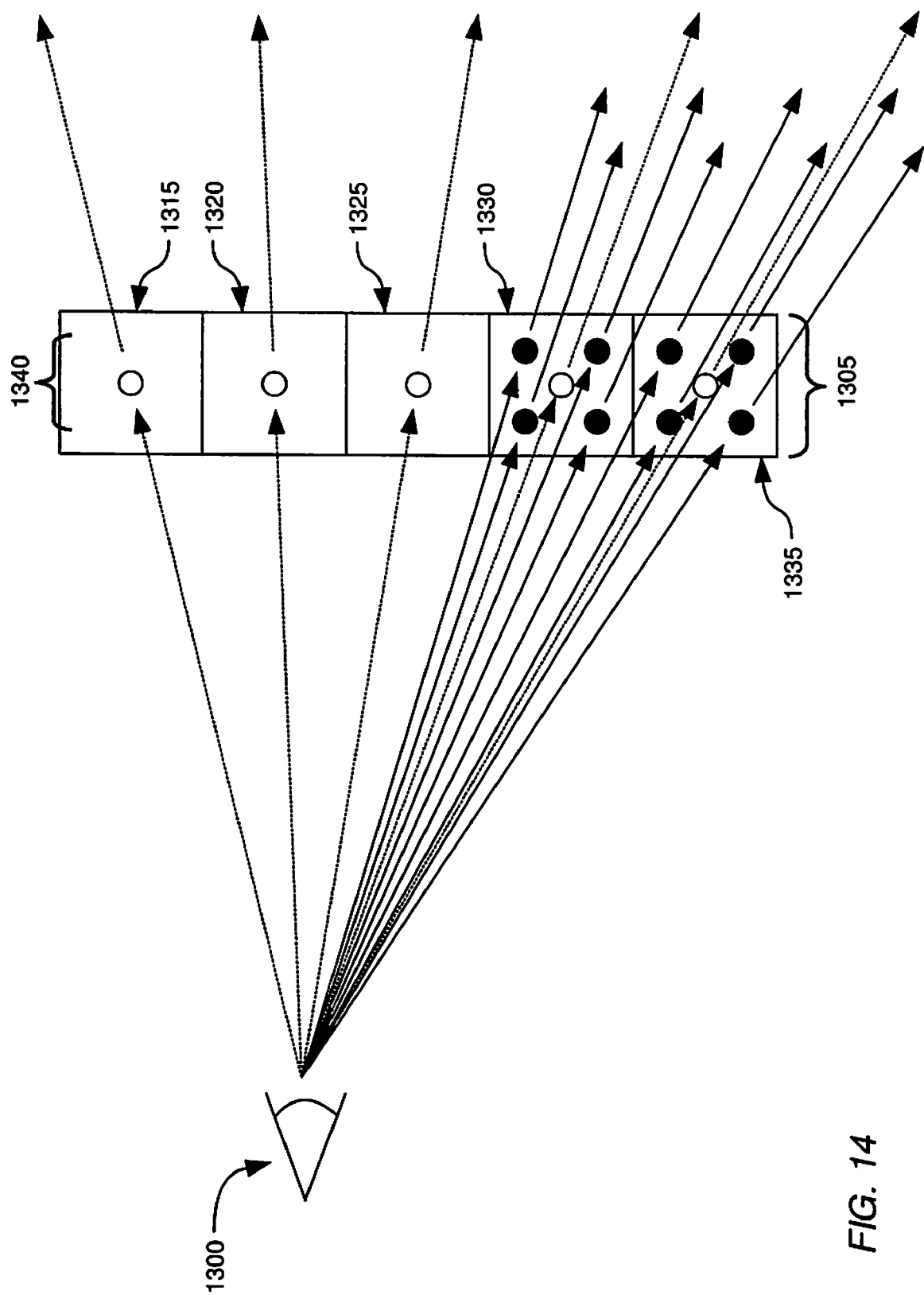

For example, FIG. 14 illustrates the five pixels (1315, 1320, 1325, 1330, and 1335) in the series of pixels 1305. FIG. 14 also illustrates (via the un-shaded circles within each pixel and the dashed arrows) that the image processing system previously issued a single preliminary ray through each pixel (e.g., 1340) in the series of pixels. At step 1210 the image processing system may have performed ray tracing for these preliminary rays, determined that the preliminary rays intersected objects or the background of the three-dimensional scene, and updated the frame buffer with initial color information based on those intersections.

After updating the frame buffer with the initial color of the five pixels (1315, 1320, 1325, 1330, and 1335), the image processing system may begin a series of steps in method 1200 to determine if the pixels contain colors of low contrast (i.e., the same or similar same colors). If they do not contain the same or similar colors, the image processing system may issue additional rays into the three dimensional scene to further determine the color of the pixels within the series of pixels 1305.

For example, the image processing system may determine by performing ray tracing with the preliminary rays that pixel 1315 and pixel 1320 have the same or a similar color, therefore the image processing system may determine the final color of pixel 1315 and pixel 1320 based on the preliminary ray alone without issuing additional rays through pixels. Similarly, the image processing system may determine that pixel 1320 and pixel 1325 have the same or a similar color, therefore no additional rays need to be issued through pixel 1320 or pixel 1325 to determine their final color.

However, during the image processing system may determine at step 1215 that pixel 1330 and pixel 1335 do not have the same or similar colors. Consequently, the image processing system may issue additional rays through pixel 1330 and pixel 1335. Exemplary additional rays are illustrated in FIG. 14 by solid arrows, and exemplary patterns of additional points for additional rays to pass through pixel 1330 and pixel 1335 are illustrated in FIG. 14 by shaded circles.

The trajectory of the additional rays may be such that the additional rays provide additional color information to the pixels. Therefore, the trajectory of the additional rays may be such that the additional rays pass through different points of the pixel than the preliminary rays as illustrated in FIG. 14.

The additional rays may aid in a more accurate determination of the colors of pixel 1330 and pixel 1335, which may maintain the quality of the image rendered by the image processing system.

CONCLUSION

According to one embodiment of the invention, by increasing the number of rays issued through adjacent pixels with colors of high contrast while maintaining the number of rays issued through adjacent pixels which do not have colors of high contrast, a ray tracing image processing system may render an anti-aliased image while minimizing the increase in workload experienced by the image processing system. Additionally, according to another embodiment of the invention, by maintaining the number of rays issued through adjacent pixels which have colors of low contrast while increasing the number of rays issued through adjacent pixels which do not have colors of low contrast, the image processing system may reduce workload experienced while performing ray tracing while maintaining the quality of the rendered image.

While the foregoing is directed to embodiments of the present invention, other and further embodiments of the invention may be devised without departing from the basic scope thereof, and the scope thereof is determined by the claims that follow.

What is claimed is:

1. A method of rendering an image of a three-dimensional scene by performing ray tracing with adaptive anti-aliasing, comprising:
- identifying, in a frame buffer and by operation of one or more computer processors, high contrast areas of pixels based on an initial set of rays issued into the scene, comprising:
  - issuing initial rays which pass through adjacent pixels and into a three-dimensional scene, wherein, for each pixel, the initial rays pass through the same one or more points in the pixel forming a pattern of points in the pixel;
  - determining initial colors of the adjacent pixels by performing ray tracing with the initial rays; and
  - comparing the initial colors of the adjacent pixels to each other to determine if the initial colors are of high contrast; and
- issuing an additional set of rays into each of the adjacent pixels having initial colors determined to be of high contrast.

2. The method of claim 1, wherein additional rays are only issued into high contrast areas.

3. The method of claim 1, wherein issuing an additional set of rays comprises:
- issuing a respective additional ray into the three dimensional scene which passes through each of the adjacent pixels;
- performing ray tracing with the additional ray for the respective adjacent pixel; and
- determining a final color of the respective adjacent pixel by combining an initial color of the respective adjacent pixel and a color contributed to the respective adjacent pixel based on results of performing ray tracing with the additional ray for the respective adjacent pixel.

4. The method of claim 3, wherein the trajectory of at least one additional ray is determined based on positions of the adjacent pixels.

5. The method of claim 4, wherein the additional rays pass through points in the first pixel close to a border of the first pixel and the second pixel.

6. The method of claim 1, wherein determining initial colors of adjacent pixels comprises:
- issuing a first initial ray into the three-dimensional scene, wherein the first initial ray passes through a first pixel of the adjacent pixels;
- performing ray tracing with the first initial ray to determine an initial color for the first pixel;
- issuing a second initial ray into the three-dimensional scene, wherein the second initial ray passes through a second pixel of the adjacent pixels; and
- performing ray tracing with the second initial ray to determine an initial color for the second pixel.

7. The method of claim 6, wherein determining if the initial colors of the adjacent pixels are of high contrast comprises:
- comparing the initial color of the first pixel and the initial color of the second pixel; and
- if the initial color of the first pixel and the initial color of the second pixel differ to a degree which exceeds a color threshold, the initial color of the first pixel and the initial color of the second pixel are colors of high contrast.

8. The method of claim 1, wherein determining the initial colors comprises determining an intersection of the initial rays and an object within the three-dimensional scene or an intersection of the initial rays and a background of the three-dimensional scene, wherein the initial color of a pixel is different than a final color of the pixel, and wherein the final color is determined by tracing secondary rays generated in response to the initial rays intersecting the object within the three-dimensional scene and calculating additional color contributions to the pixel based on one or more objects intersected by the secondary rays.

9. A non-transitory computer readable storage medium containing a program which, when executed, performs an operation, comprising:
- identifying, in a frame buffer, high contrast areas of pixels based on an initial set of rays issued into a three-dimensional scene, comprising:
  - issuing initial rays which pass through adjacent pixels and into a three-dimensional scene, wherein, for each pixel, the initial rays pass through the same one or more points in the pixel forming a pattern of points in the pixel;
  - determining an initial color by performing ray tracing with the initial rays; and
  - comparing the initial colors of the adjacent pixels to each other to determine if the initial colors are of high contrast; and
- issuing an additional set of rays into each of the adjacent pixels having initial colors determined to be of high contrast.

10. The computer readable storage medium of claim 9, wherein additional rays are only issued into high contrast areas.

11. The computer readable storage medium of claim 9, wherein issuing an additional set of rays comprises:
- issuing a respective additional ray into the three dimensional scene which passes through each of the adjacent pixels;
- performing ray tracing with the additional ray for the respective adjacent pixel; and
- determining a final color of the respective adjacent pixel by combining an initial color of the respective adjacent pixel and a color contributed to the respective adjacent pixel based on results of performing ray tracing with the additional ray for the respective adjacent pixel.

12. The computer readable storage medium of claim 11, wherein the trajectory of at least one additional ray is determined based on positions of the adjacent pixels.

13. The computer readable storage medium of claim 12, wherein the additional rays pass through points in the first pixel close to a border of the first pixel and the second pixel.

14. The computer readable storage medium of claim 9, wherein determining initial colors of adjacent pixels comprises:
- issuing a first initial ray into the three-dimensional scene, wherein the first initial ray passes through a first pixel of the adjacent pixels;
- performing ray tracing with the first initial ray to determine an initial color for the first pixel;
- issuing a second initial ray into the three-dimensional scene, wherein the second initial ray passes through a second pixel of the adjacent pixels; and
- performing ray tracing with the second initial ray to determine an initial color for the second pixel.

15. The computer readable storage medium of claim 9, wherein determining if the initial colors of the adjacent pixels are of high contrast comprises:
- comparing the initial color of the first pixel and the initial color of the second pixel; and
- if the initial color of the first pixel and the initial color of the second pixel differ to a degree which exceeds a color threshold, the initial color of the first pixel and the initial color of the second pixel are colors of high contrast.

16. The computer readable storage medium of claim 9, wherein determining the initial colors comprises determining an intersection of the initial rays and an object within the three-dimensional scene or an intersection of the initial rays and a background of the three-dimensional scene, wherein the initial color of a pixel is different than a final color of the pixel, and wherein the final color is determined by tracing secondary rays generated in response to the initial rays intersecting the object within the three-dimensional scene and calculating additional color contributions to the pixel based on one or more objects intersected by the secondary rays.

17. An image processing system, comprising:
a memory device configured to store color information for each pixel in a frame of pixels; and
a processing element configured to:
identify, in the memory device, high contrast areas of pixels based on an initial set of rays issued into a three-dimensional scene, comprising:
issuing initial rays which pass through adjacent pixels and into the three-dimensional scene, wherein, for each pixel, the initial rays pass through the same one or more points in the pixel forming a pattern of points in the pixel;
determining initial colors of the adjacent pixels by performing ray tracing with the initial rays;
storing the initial colors in memory locations within the memory device corresponding to the adjacent pixels; and
comparing the initial colors of the adjacent pixels to each other to determine if the initial colors are of high contrast; and
issue an additional set of rays into each of the adjacent pixels having initial colors determined to be of high contrast.

18. The image processing system of claim 17, wherein additional rays are only issued into high contrast areas.

19. The image processing system of claim 17, wherein issuing an additional set of rays comprises:
issuing a respective additional ray into the three dimensional scene which passes through each of the adjacent pixels;
performing ray tracing with the respective additional ray;
determining a final color of the at least one of the adjacent pixels by combining an initial color of the adjacent pixel and a color contributed to the adjacent pixel based on results of performing ray tracing with the respective additional ray; and
storing the final color of the at least one of the adjacent pixels in a corresponding memory location within the memory device.

20. The image processing system of claim 19, wherein the trajectory of at least one additional ray is determined based on positions of the adjacent pixels.

21. The image processing system of claim 17, wherein determining the initial colors comprises determining an intersection of the initial rays and an object within the three-dimensional scene or an intersection of the initial rays and a background of the three-dimensional scene, wherein the initial color of a pixel is different than a final color of the pixel, and wherein the final color is determined by tracing secondary rays generated in response to the initial rays intersecting the object within the three-dimensional scene and calculating additional color contributions to the pixel based on one or more objects intersected by the secondary rays.

* * * * *